US007163147B2

(12) United States Patent
Cummings

(10) Patent No.: US 7,163,147 B2
(45) Date of Patent: Jan. 16, 2007

(54) BALLOT MARKING SYSTEM AND APPARATUS UTILIZING DUAL PRINT HEADS

(75) Inventor: Eugene M. Cummings, Lake Forest, IL (US)

(73) Assignee: Automark Technical Systems, LLC, Chicago, IL (US)

( * ) Notice: Subject to any disclaimer, the term of this patent is extended or adjusted under 35 U.S.C. 154(b) by 0 days.

(21) Appl. No.: 10/454,555

(22) Filed: Jun. 4, 2003

(65) Prior Publication Data

US 2004/0016803 A1 Jan. 29, 2004

Related U.S. Application Data

(63) Continuation-in-part of application No. 10/347,528, filed on Jan. 17, 2003, now Pat. No. 7,100,828.

(60) Provisional application No. 60/398,919, filed on Jul. 26, 2002.

(51) Int. Cl.
*G06K 17/00* (2006.01)

(52) U.S. Cl. ........................................ 235/386; 235/51

(58) Field of Classification Search ................ 235/386, 235/435, 436, 375, 454, 487, 494, 51; 705/12
See application file for complete search history.

(56) References Cited

U.S. PATENT DOCUMENTS 2,940,663 A 6/1960 Fechter et al.
3,218,439 A 11/1965 Holzer et al.
3,226,018 A 12/1965 Railsback et al.
3,233,826 A 2/1966 Wiken
3,441,714 A 4/1969 Simjian
3,620,587 A 11/1971 Ahmann
3,648,022 A 3/1972 Cook
3,653,587 A 4/1972 Hammond et al.
3,722,793 A 3/1973 Aronoff
3,733,469 A 5/1973 Meyer (Continued)

FOREIGN PATENT DOCUMENTS

JP 07246732 A 9/1995

OTHER PUBLICATIONS

Mercuri, Rebecca, *A Better Ballot Box?*, IEEE Spectrum, Oct. 2002, pp. 46-50, New York, New York, USA.

(Continued)

*Primary Examiner*—Steven S. Paik
(74) *Attorney, Agent, or Firm*—Cook, Alex, McFarron, Manzo, Cummings & Mehler, Ltd.

(57) ABSTRACT

A system and apparatus for marking a pre-printed paper ballot which can be either hand-marked by a voter, or machine-marked by the apparatus. If the ballot is to be machine marked, the ballot is inserted into the marking apparatus and candidate selections are presented to the voter on a touchscreen. Candidate selections entered on the touch-screen are marked on both the top and bottom sides of the ballot utilizing a dual print head to mark spaces corresponding to the selected candidates, and the ballot is returned to the voter in a form which enables the voter to visually confirm that his selections have been marked. The ballot, whether hand-marked or machine-marked, is inserted in a ballot scanning device, wherein it is tallied and deposited in a ballot box.

5 Claims, 26 Drawing Sheets

U.S. PATENT DOCUMENTS

| | | | |
|---|---|---|---|
| 4,021,780 A | 5/1977 | Narey et al. | |
| 4,066,871 A | 1/1978 | Carson, Sr. et al. | |
| 4,142,095 A | 2/1979 | Cason, Sr. et al. | |
| 4,236,066 A | 11/1980 | Olmstead et al. | |
| 4,373,134 A | 2/1983 | Grace et al. | |
| 4,479,194 A | 10/1984 | Fogg et al. | |
| 4,641,240 A | 2/1987 | Boram | |
| 4,649,264 A | 3/1987 | Carson | |
| 4,774,665 A * | 9/1988 | Webb | 705/12 |
| 4,807,908 A | 2/1989 | Gerbel | |
| 4,813,708 A * | 3/1989 | Narey | 283/5 |
| 4,981,259 A | 1/1991 | Ahmann | |
| 5,072,999 A | 12/1991 | Trotta et al. | |
| 5,213,373 A | 5/1993 | Ramos | |
| 5,218,528 A | 6/1993 | Wise et al. | |
| 5,248,872 A | 9/1993 | Stewart | |
| 5,278,753 A | 1/1994 | Graft, III | |
| 5,377,099 A | 12/1994 | Miyagawa | |
| 5,497,318 A | 3/1996 | Miyagawa et al. | |
| 5,535,118 A | 7/1996 | Chumbley | |
| 5,583,329 A * | 12/1996 | Davis et al. | 235/50 A |
| 5,585,612 A | 12/1996 | Harp, Jr. | |
| 5,610,383 A * | 3/1997 | Chumbley | 235/386 |
| 5,635,726 A | 6/1997 | Zavislan et al. | |
| 5,666,765 A | 9/1997 | Sarner et al. | |
| 5,732,222 A | 3/1998 | Miyagawa et al. | |
| 5,758,325 A | 5/1998 | Lohry et al. | |
| 5,764,221 A | 6/1998 | Willard | |
| 5,875,432 A | 2/1999 | Sehr | |
| 5,878,399 A | 3/1999 | Peralto | |
| 6,078,902 A | 6/2000 | Schenkler | |
| 6,079,624 A * | 6/2000 | Apperson et al. | 235/494 |
| 6,081,793 A | 6/2000 | Challener et al. | |
| 6,134,399 A | 10/2000 | Hino et al. | |
| 6,194,698 B1 | 2/2001 | Zavislan et al. | |
| 6,250,548 B1 | 6/2001 | McClure et al. | |
| 6,412,692 B1 | 7/2002 | Miyagawa | |
| 6,457,643 B1 | 10/2002 | Way et al. | |
| 6,606,082 B1 | 8/2003 | Zuberec et al. | |
| 6,607,137 B1 | 8/2003 | Morales | |
| 6,694,045 B1 | 2/2004 | Shi et al. | |
| 6,769,613 B1 * | 8/2004 | McDermott et al. | 235/386 |
| 6,865,543 B1 * | 3/2005 | Gibbs, Sr. | 705/12 |
| 2001/0013547 A1 | 8/2001 | Kotob et al. | |
| 2001/0034640 A1 | 10/2001 | Chaum | |
| 2001/0354455 | 11/2001 | Davis et al. | |
| 2002/0038819 A1 | 4/2002 | Ushioda et al. | |
| 2002/0066780 A1 * | 6/2002 | Balolia | 235/51 |
| 2002/0074399 A1 | 6/2002 | Hall et al. | |
| 2002/0075246 A1 | 6/2002 | Zheltukhin | |
| 2002/0077885 A1 | 6/2002 | Karro et al. | |
| 2002/0077886 A1 | 6/2002 | Chung | |
| 2002/0078358 A1 | 6/2002 | Neff et al. | |
| 2002/0084325 A1 * | 7/2002 | Reardon | 235/386 |
| 2002/0087394 A1 | 7/2002 | Zhang | |
| 2002/0092908 A1 * | 7/2002 | Chumbley | 235/386 |
| 2002/0107724 A1 | 8/2002 | Openshaw, II et al. | |
| 2002/0133396 A1 | 9/2002 | Barnhart | |
| 2002/0134844 A1 | 9/2002 | Morales | |
| 2002/0138341 A1 | 9/2002 | Rodriguez | |
| 2002/0143610 A1 | 10/2002 | Munyer | |
| 2002/0161628 A1 | 10/2002 | Poor et al. | |
| 2003/0026462 A1 | 2/2003 | Chung | |
| 2003/0034393 A1 | 2/2003 | Chung | |
| 2003/0062411 A1 | 4/2003 | Chung et al. | |
| 2003/0136835 A1 | 7/2003 | Chung | |
| 2003/0173404 A1 | 9/2003 | Chung | |
| 2003/0178484 A1 * | 9/2003 | Vadura et al. | 235/386 |
| 2004/0046021 A1 | 3/2004 | Chung | |
| 2004/0066441 A1 * | 4/2004 | Jones et al. | 347/101 |
| 2004/0140357 A1 | 7/2004 | Cummings | |
| 2004/0169077 A1 | 9/2004 | Petersen et al. | |

OTHER PUBLICATIONS

Kofler, Robert; Krimmer, Robert; Prosser, Alexander, *Electronic Voting: Algorithmic and Implentation Issues*, IEEE Computer Society, New York, New York, USA, 2003.

Bellinger, Robert, *Can We Be Spared A Repeat of Election 2000?*, IEEE, Feb. 2001, pp. 1-3, New York, New York, USA.

Mercuri, Rebecca, *A Better Ballot Box?*, IEEE Spectrum, Oct. 2002, pp. 46-50, New York, New York, USA.

DëCarvalho, Luiz Pinto, *Electronic Electrons*, IEEE Spectrum, Feb. 2003, p. 15, New York, New York, USA.

Kofler, Robert; Krimmer, Robert; Prosser, Alexander, *Electronic Voting: Algorithmic and Implentation Issues*, IEEE Computer Society, New York, New York USA.

Bellinger, Robert, *Can We Be Spared A Repeat of Election 2000?*, IEEE, Feb. 2001, pp. 1-3, New York, New York, USA.

* cited by examiner

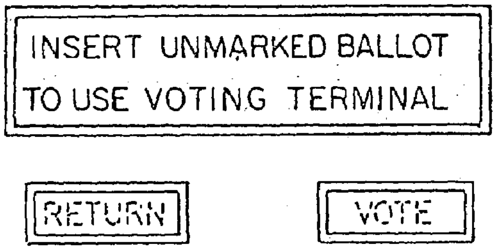
FIG. 12A
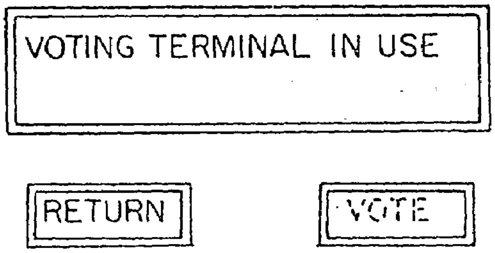
FIG. 12B
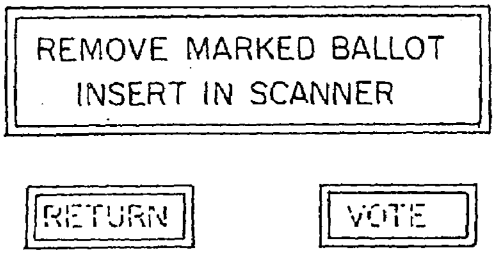
FIG. 12C
FIG. 13
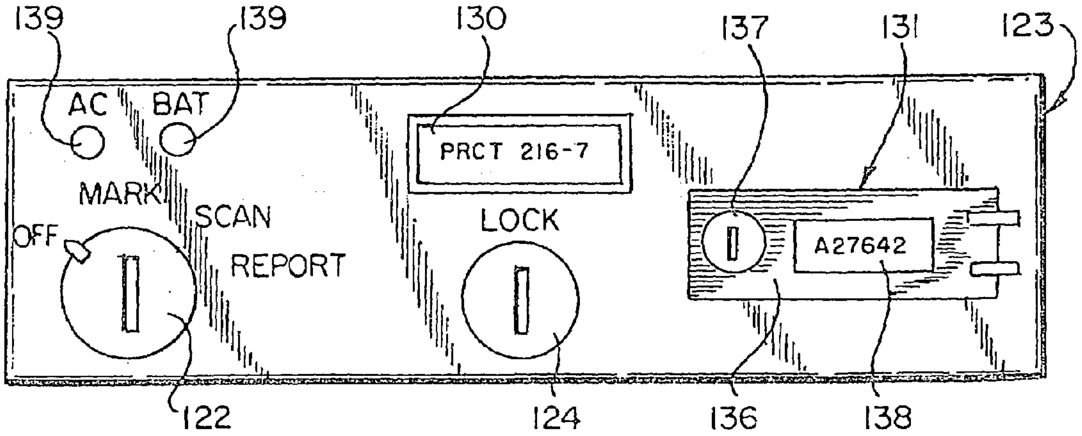

BALLOT MARKING SYSTEM AND APPARATUS UTILIZING DUAL PRINT HEADS

CROSS-REFERENCE TO RELATED APPLICATION

This application claims benefit as a Continuation-In-Part of application Ser. No. 10/347,528 filed Jan. 17, 2003, now U.S. Pat. No. 7,100,828, which claims benefit under 35 U.S.C. §119(e) of U.S. Provisional Application, Ser. No. 60/398,919 filed Jul. 26, 2002, the complete disclosure thereof being incorporated by reference.

BACKGROUND OF THE INVENTION

The present invention relates generally to systems, methods and apparatus for conducting elections, and particularly, to a system, method and apparatus which utilizes a physical ballot, formed of a markable material, such as paper, cardboard, or a thin plastic sheet, or the like, which can be either manually marked by a voter, or electronically marked by an electronic voting station, and then visually or otherwise verified by the voter, electronically scanned and tallied, and preserved in a ballot box for recount purposes.

Traditionally, elections for public office in the United States have been conducted with voting systems utilizing hand-marked paper ballots. Typically, in such systems a paper ballot is issued to a verified voter by an election judge. The voter takes the ballot to a voting booth, where he manually marks his selections by placing marks or punch holes in marking spaces associated with the candidates he or she selects. The marked ballot is then taken by the voter to a ballot box where it is inserted and stored for subsequent hand or machine counting.

In recent years, the traditional system has been improved with the use of a ballot scanner to tally the hand-marked ballots as they are inserted into the ballot box. This has the advantage of making vote tallies immediately available at the close of polling, and, with scanners so-equipped, of preventing unintentional under-votes and over-votes. However, one drawback of the traditional system remains in that there is no provision for assisting voters who have a physical impairment, which would interfere with the manual marking of a ballot. Previous attempts at assisting such impaired voters have utilized electronic voting terminals wherein, instead of presenting candidate choices on a paper ballot, candidate choices are serially presented to the voter on large, easily viewable touch-screen displays. When the voter has made his selections, the results are tallied within the voting terminal, the total votes for each candidate being read from the terminal electronically or by means of a paper tape at the close of the polling place.

One drawback of electronic voting terminals is that there is no satisfactory means for auditing the voting process, i.e. confirming that each vote is tallied as voted, and that no votes are tallied which were not voted. Furthermore, there is no means for an individual voter to confirm for his or herself that his or her vote has actually been counted. Attempts at addressing these deficiencies have centered on the use of a paper tape or slip printed concurrently with each voter's voting. Such tapes and slips, which bear little or no resemblance to a ballot, have proven difficult to interpret by the voter and do not confirm that the vote has been actually tallied.

Another drawback of the use of the electronic voting terminals is that they are inherently less efficient since voters require more time to electronically vote their ballot than is required to mark or punch a paper ballot providing the same candidate choices. Consequently, to avoid long lines at a polling place, a large number of electronic voting stations must be provided, if such stations are utilized as the sole means of voting. This imposes an undesirable cost and space burden on voting jurisdictions, since the electronic voting stations are expensive to own and maintain and require additional space in use and in storage.

Accordingly, it is the general object of the invention to provide a new and improved voting system, method and apparatus.

It is a more specific object of the invention to provide an improved voting system which utilizes a voter-readable and machine-readable physical ballot which can be either hand-marked in a voting booth, or electronically marked at an electronic voting station by means of a touch screen voting terminal and associated marking device.

It is a still more specific object of the invention to provide a system and apparatus for efficiently and accurately marking a two-sided physical ballot utilizing two print heads.

SUMMARY OF THE INVENTION

The invention is generally directed to a ballot marking apparatus adapted to mark a user-readable ballot having a front side and a reverse side and containing a plurality of races on the front and reverse sides in accordance with selections made by a voter, each of the races having a plurality of candidates, the apparatus comprising: a housing; a user input device on the housing; a slot in the housing for receiving the ballot from a voter; a first marking head positioned along the path to print on the front side of the ballot; a second marking head positioned along the path to print on the reverse of the ballot; and a paper path defined within the housing for receiving the ballot as it passes through the slot and conveying the ballot past the first and second marking heads, the heads marking the front and reverse sides of the ballot, respectively, in accordance with the selections made by the voter.

The features of the present invention which are believed to be novel, are set forth with particularity in the appended claims. The invention, together with the further objects and advantages thereof, may best be understood by reference to the following description taken in conjunction with the accompanying drawings, in the several figures of which like reference numerals identify like elements, and in which:

Figure 1:
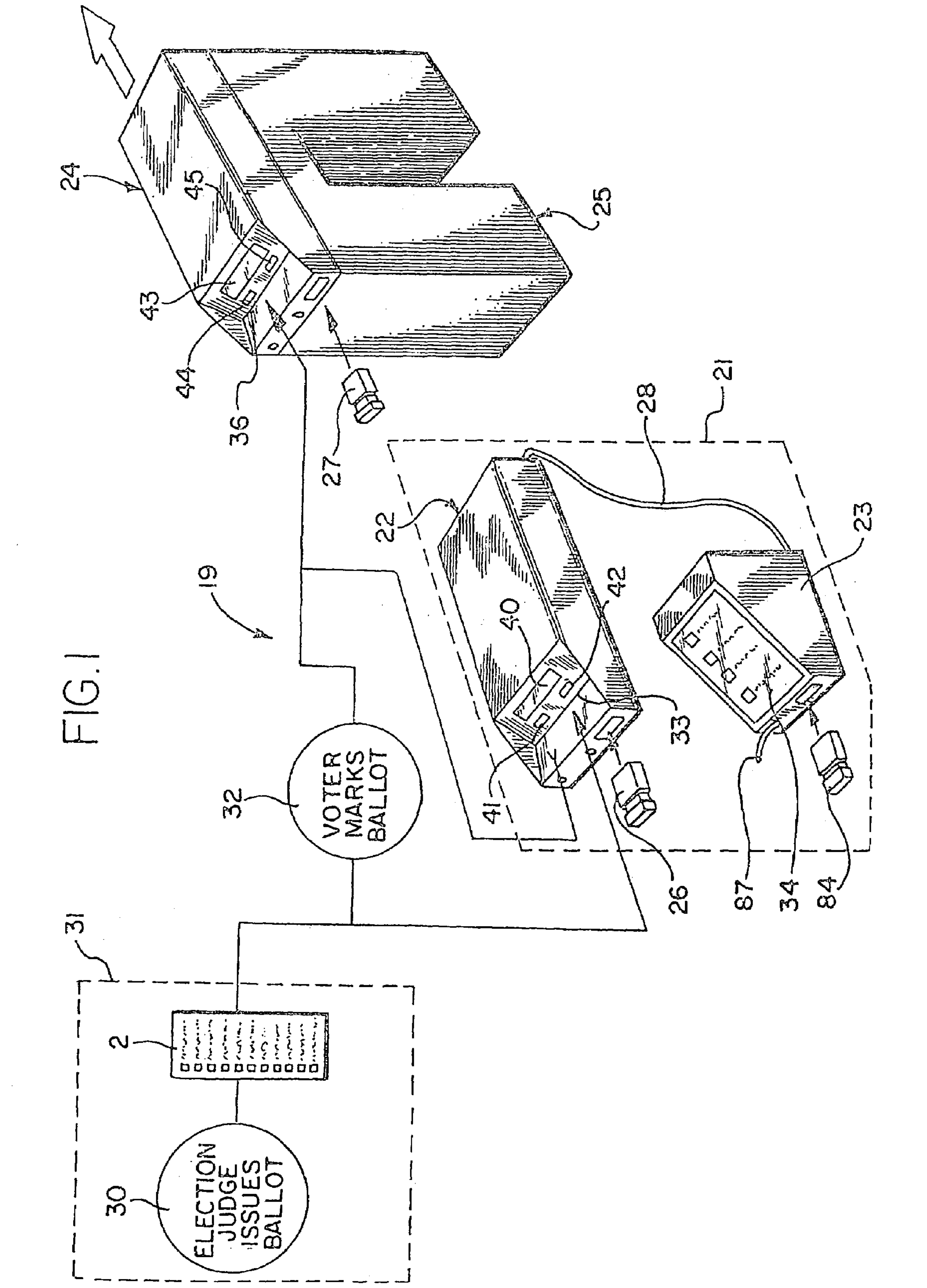
FIG. 1 is a simplified perspective view of a voting system utilizing hand-marked and machine-marked paper ballots, a ballot issuing station, a ballot marking station comprising a ballot marking device and an electronic voting terminal, a ballot scanner device and a ballot box.
Figure 3:
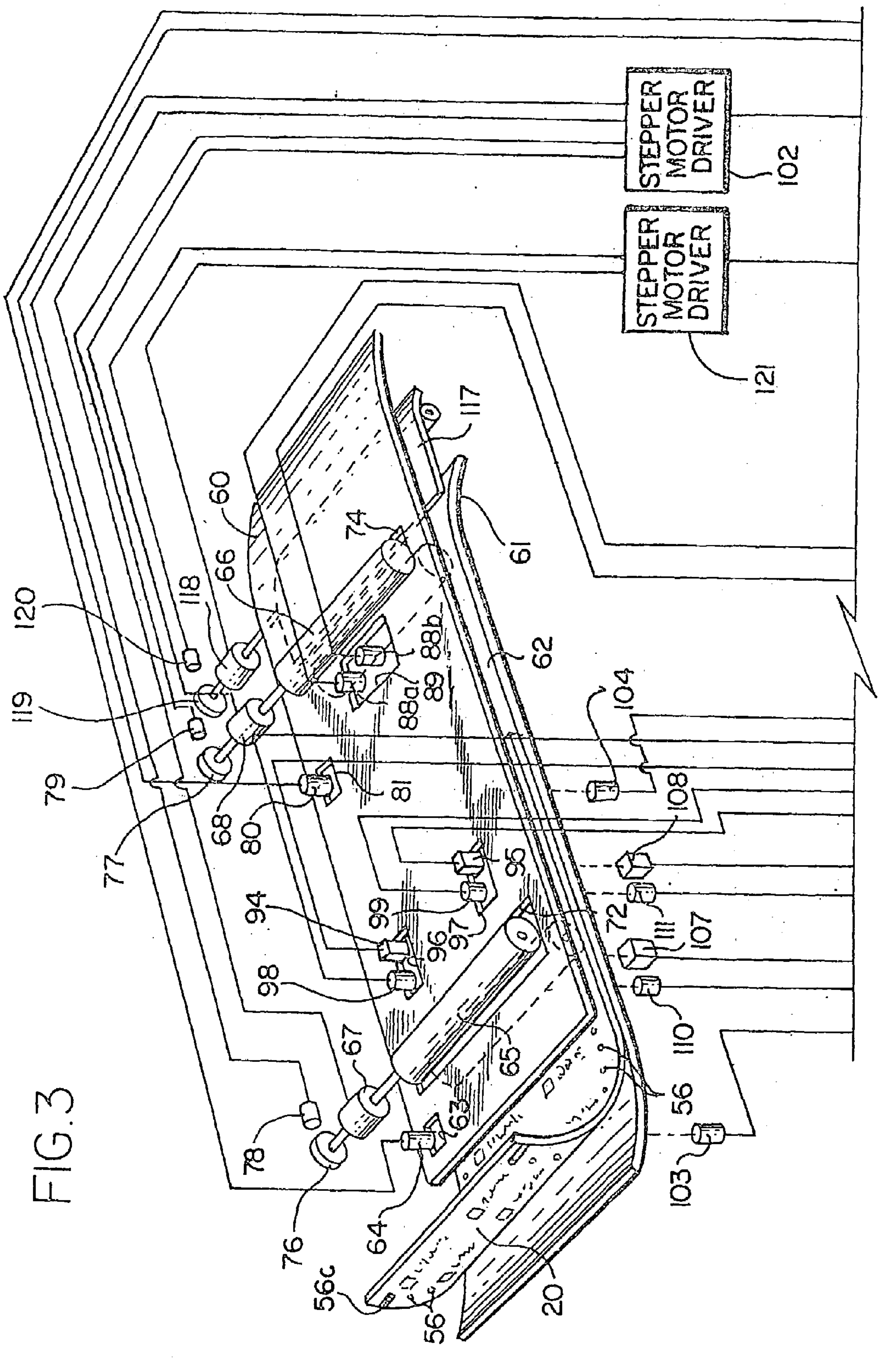
Figure 3A:
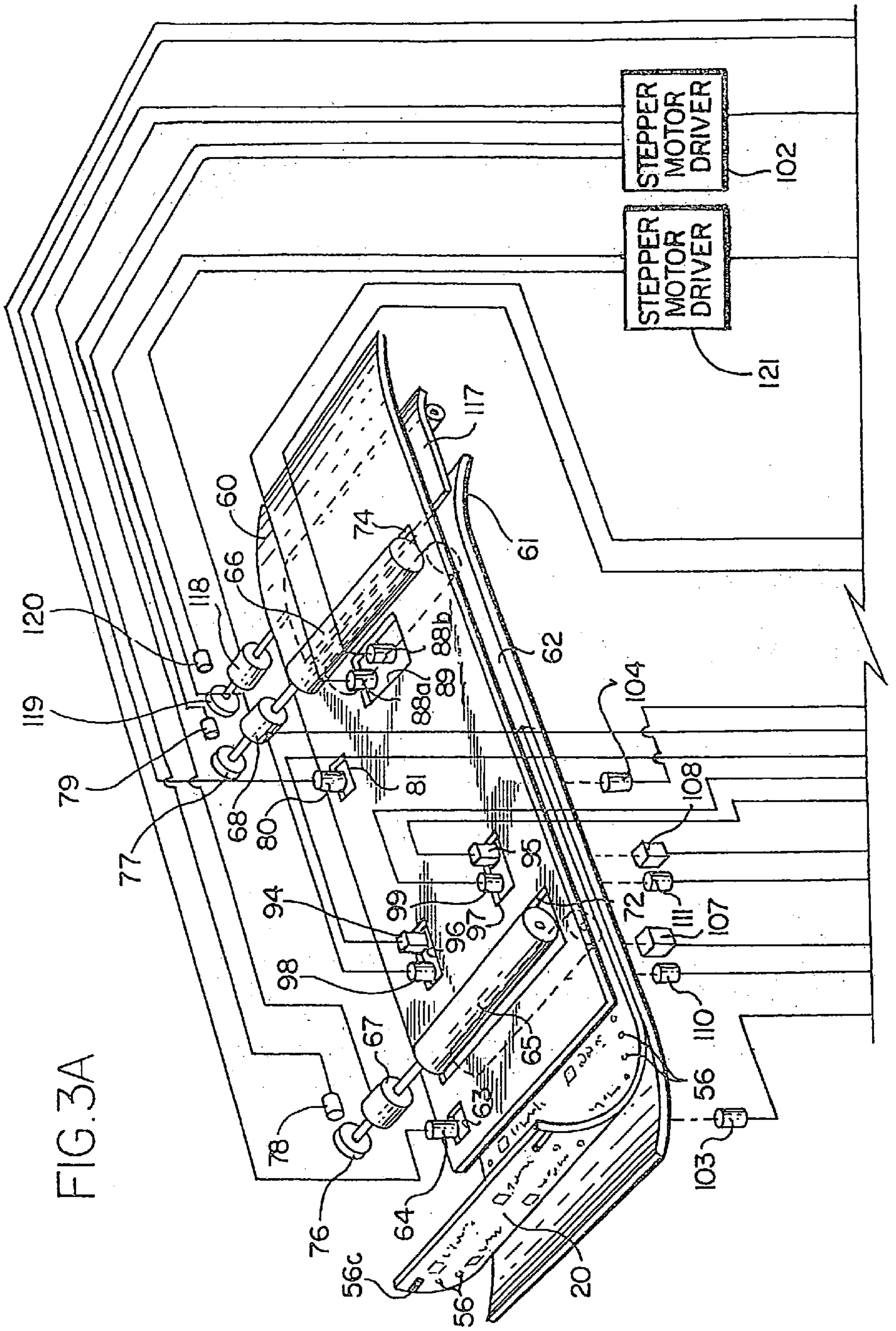
Figure 3B:
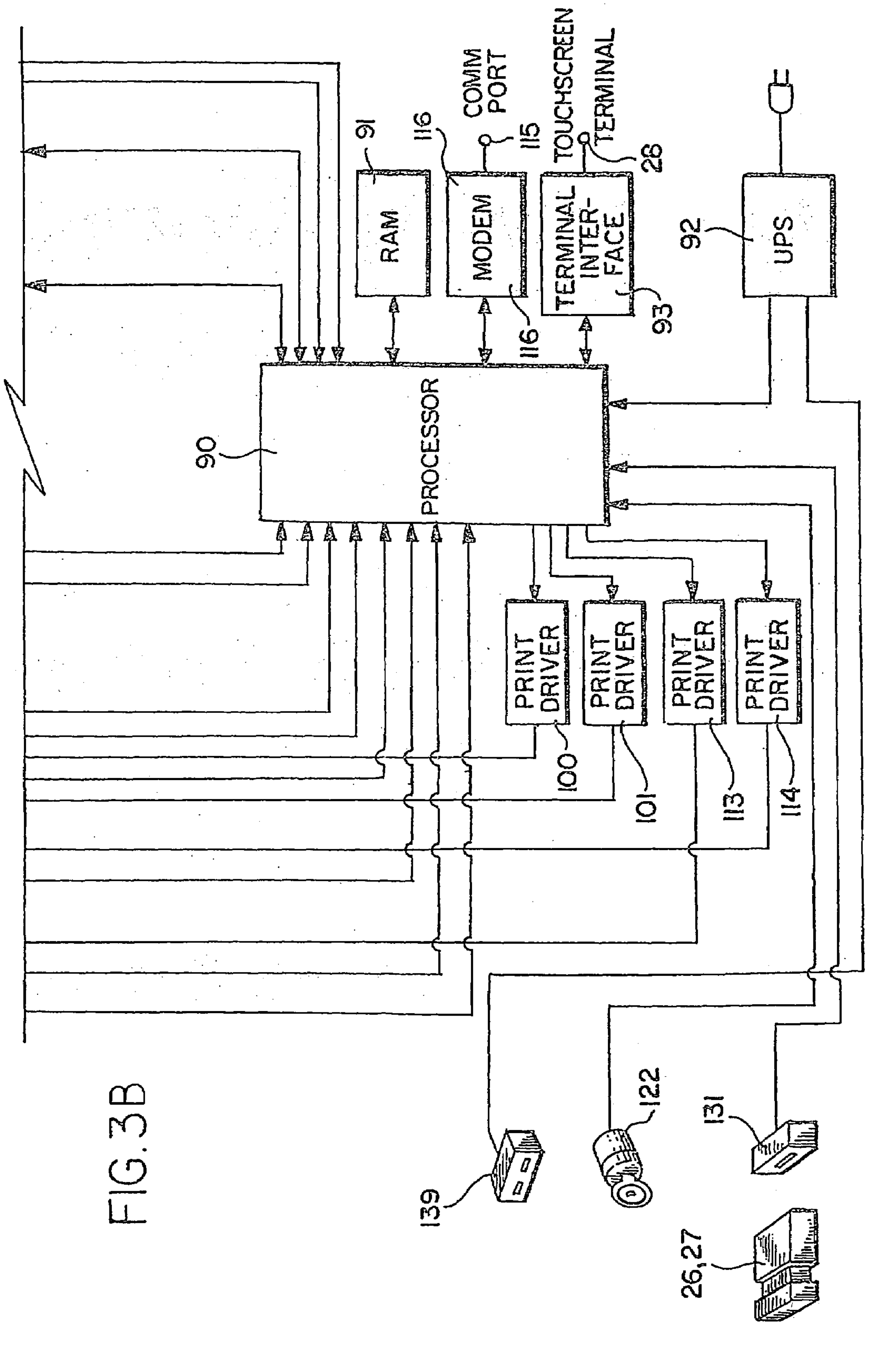

FIGS. 3A and 3B provide a simplified perspective view of a ballot handling, sensing and marking apparatus, and the principal electronic circuits and components utilized therein, for use in the voting system of FIG. 1.

Figures 4, 5:
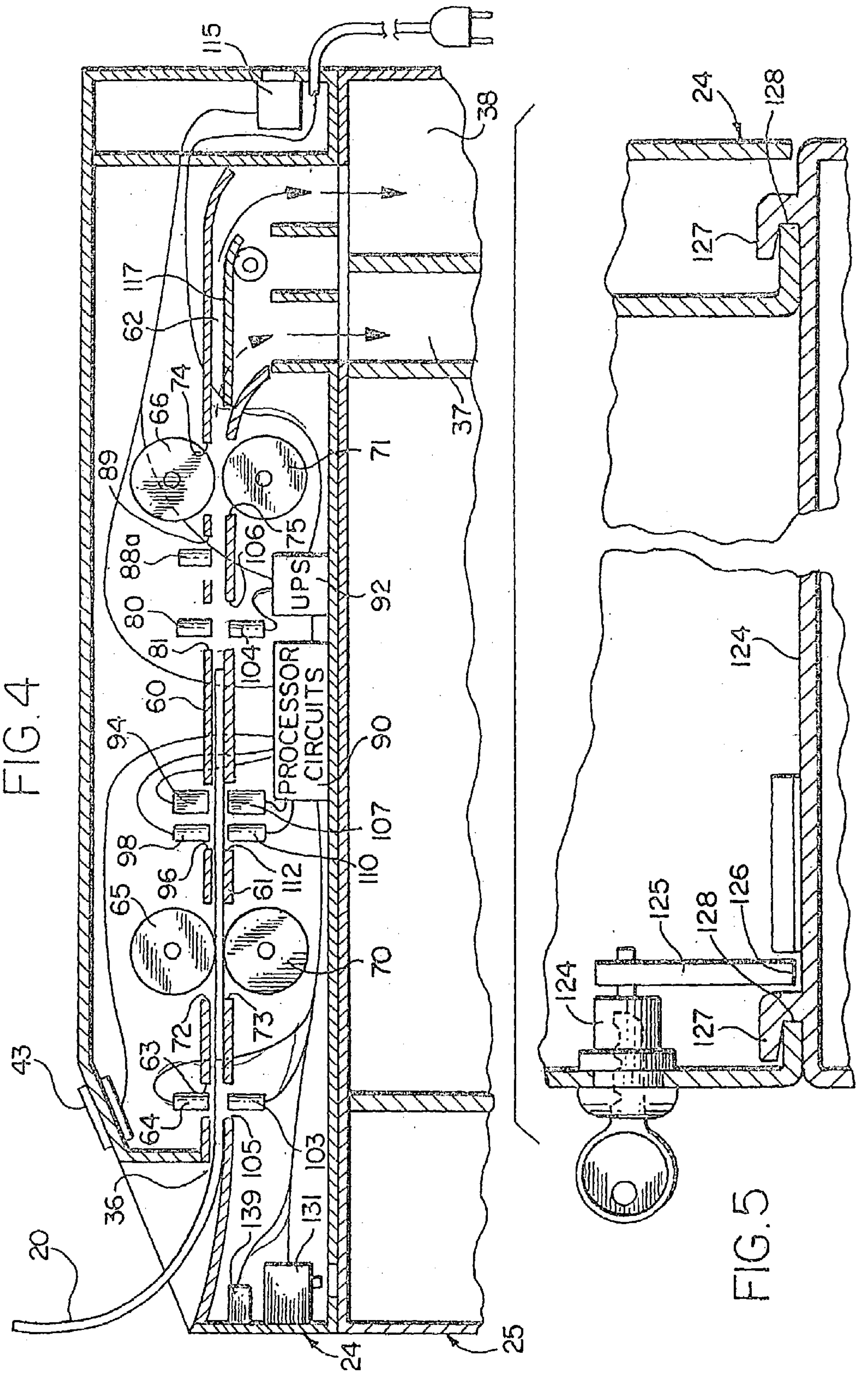
Figure 7:
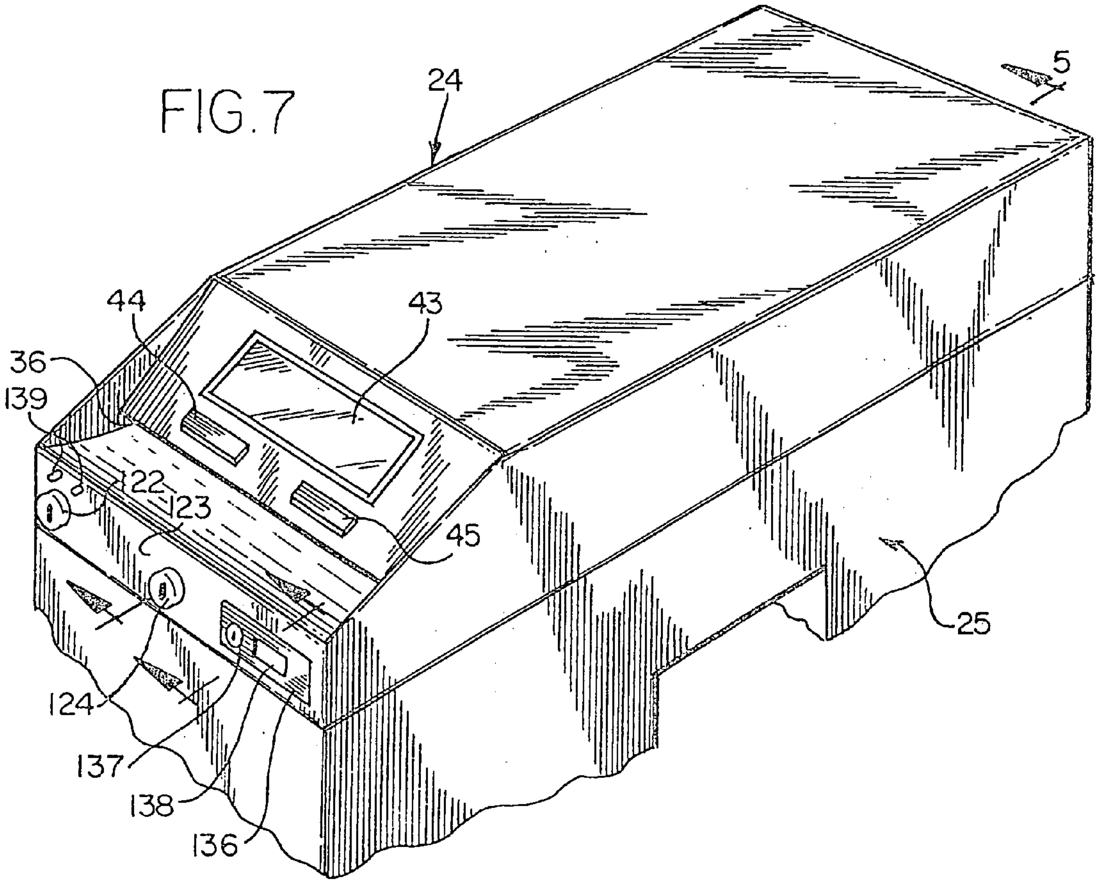

FIG. 4 is an enlarged cross-sectional view of the apparatus depicted in FIG. 3 taken along lines 4—4 of FIG. 7 showing the apparatus operating as a ballot scanning device.

FIG. 5 is an enlarged cross-sectional view taken along line 5—5 of FIG. 7 showing a locking arrangement for preventing unauthorized removal of the scanning device from a ballot box.

Figure 6:
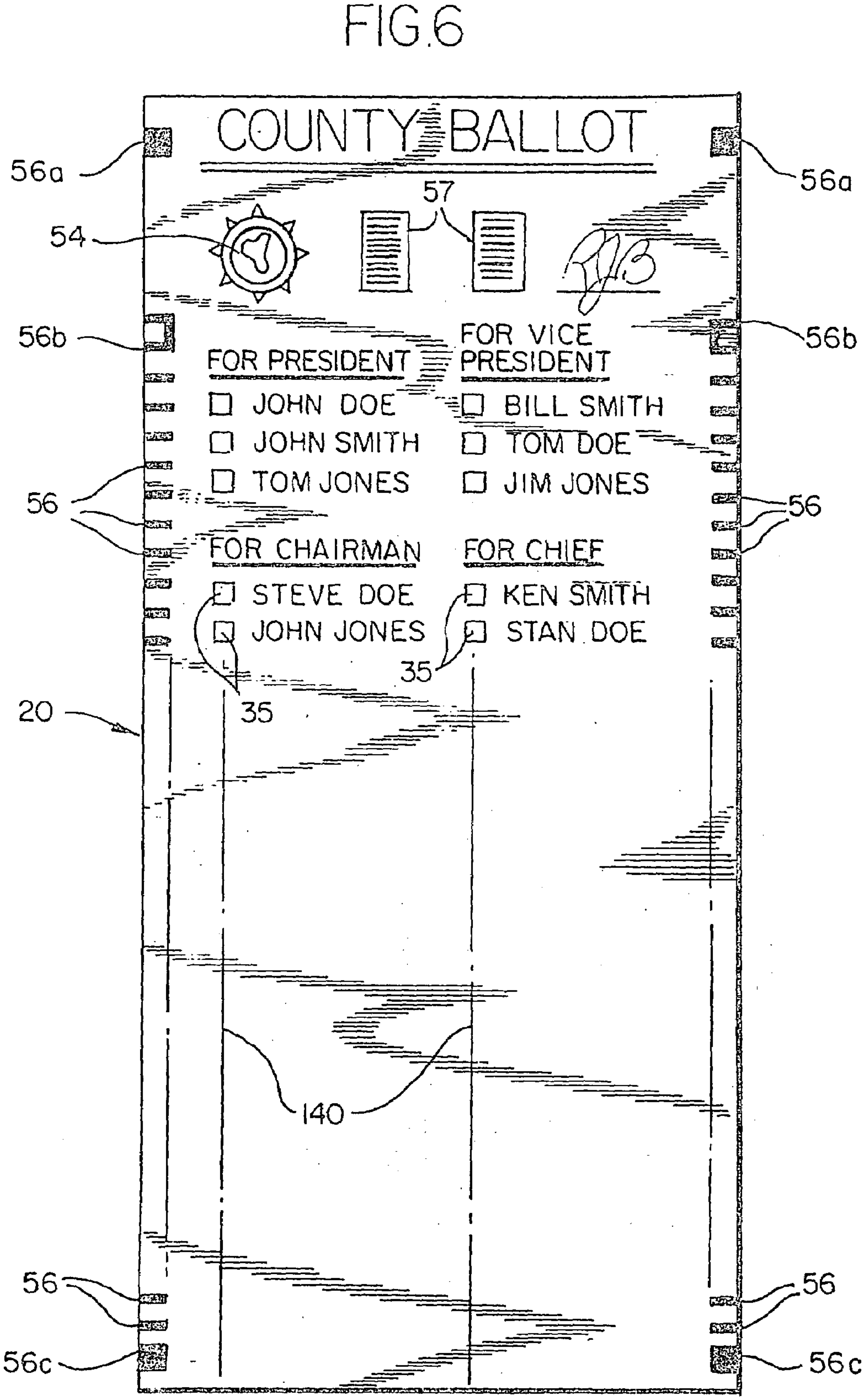

FIG. 6 is a plan view of a voter —and machine-markable, voter —and machine-readable paper ballot adapted for use in the voting system of FIG. 1.

FIG. 7 is a perspective view of the ballot scanning device utilized in the voting system of FIG. 1 showing the scanning device installed on a ballot box.

Figure 8:
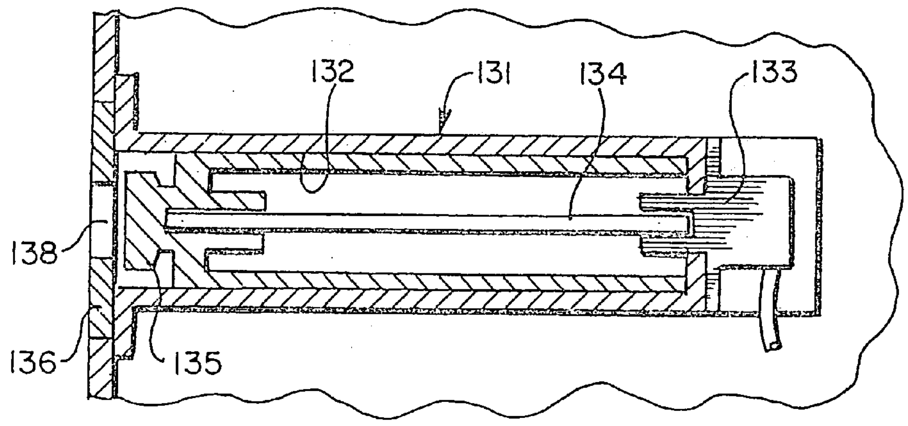

FIG. 8 is an enlarged cross-sectional view taken along line 8—8 of FIG. 7 showing the receptacle provided in the housing of the ballot scanning device of FIG. 7 for receiving a ballot data module.

Figure 9:
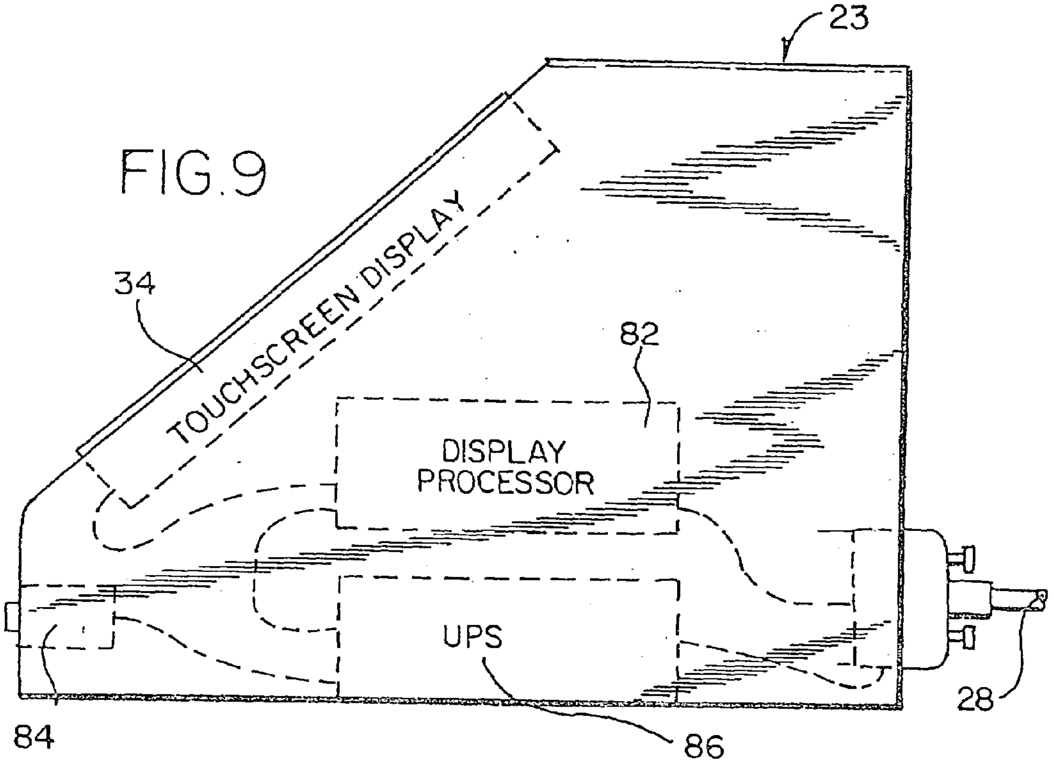

FIG. 9 is a side elevational view of the voting terminal utilized in the voting system of FIG. 1 showing the touch-screen display and other major components utilized therein.

Figure 10:
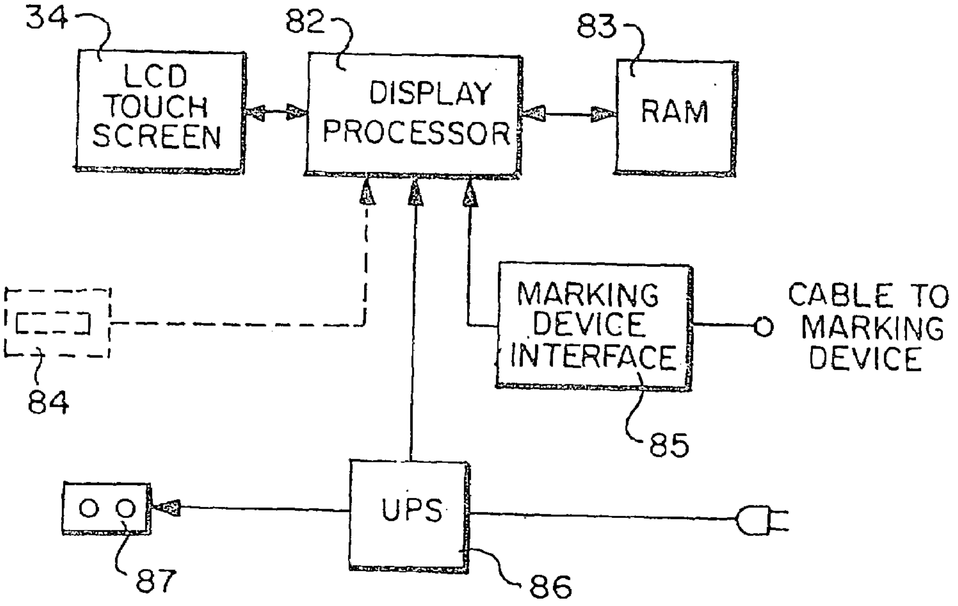

FIG. 10 is a simplified block diagram showing the major components of the voting terminal of FIG. 9.

FIGS. 11A–11E are a series of views of the message display provided on the ballot scanner device utilized in the voting system of FIG. 1 showing various messages displayed to the voter during operation of the scanning device.

FIGS. 12A–12C are a series of views of the message display provided on the ballot marking device utilized in the voting system of FIG. 1 showing various messages displayed to the voter during operation of the marking device.

FIG. 13 is an enlarged front elevational view of the control panel provided on the ballot marking and scanning devices utilized in the voting system of FIG. 1.

Figure 14A:
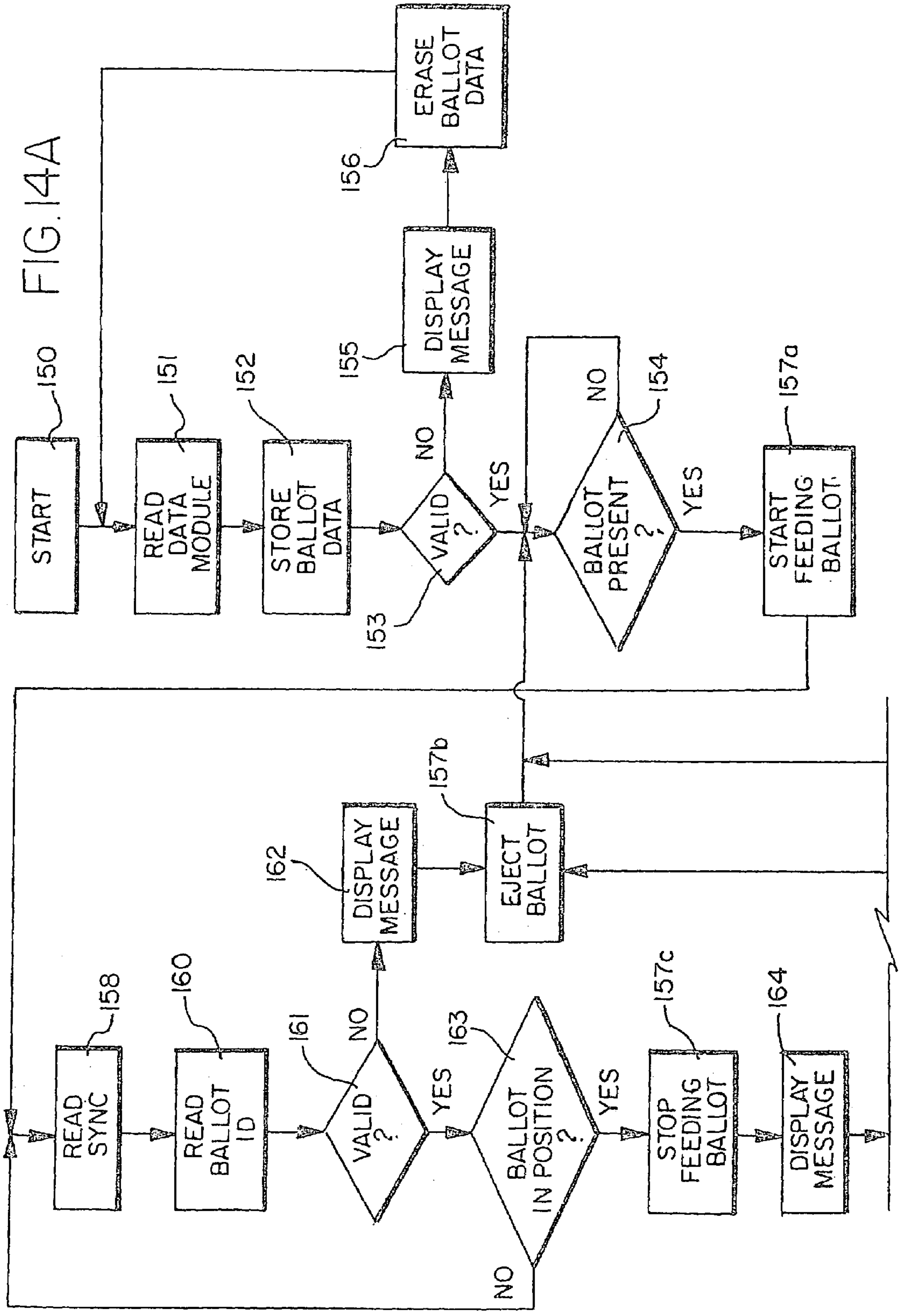
Figure 14B:
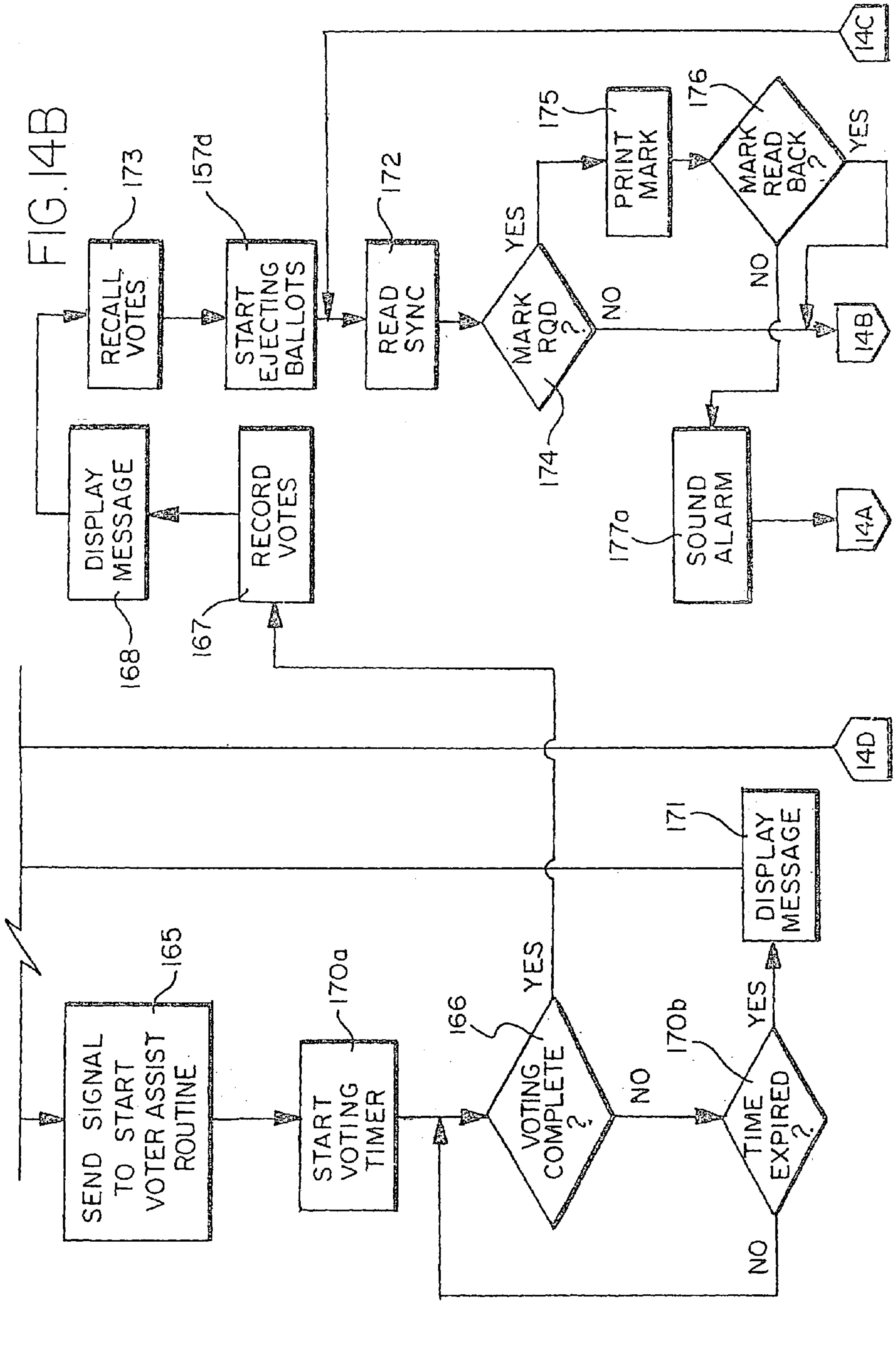
Figure 14C:
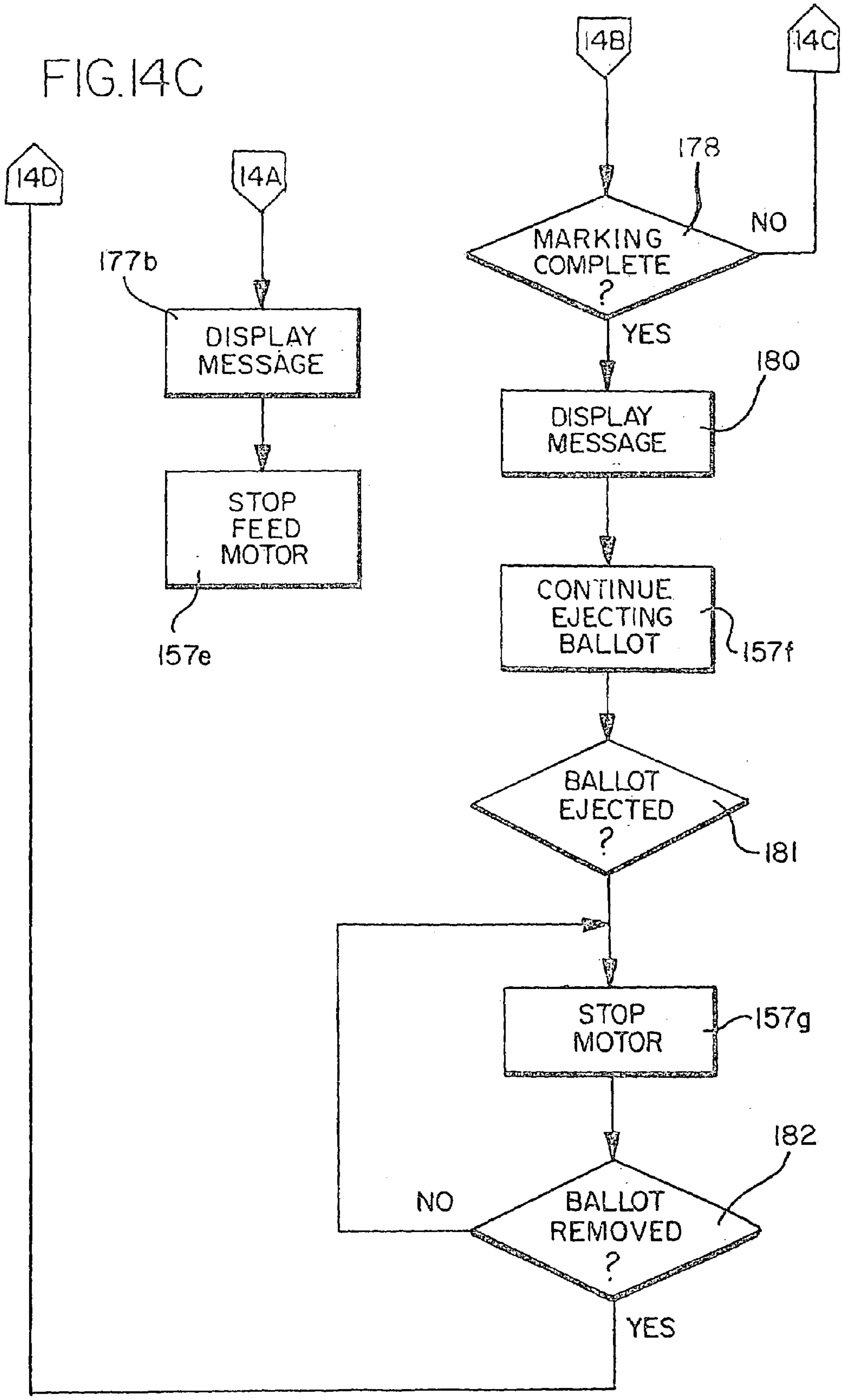
Figure 15A:
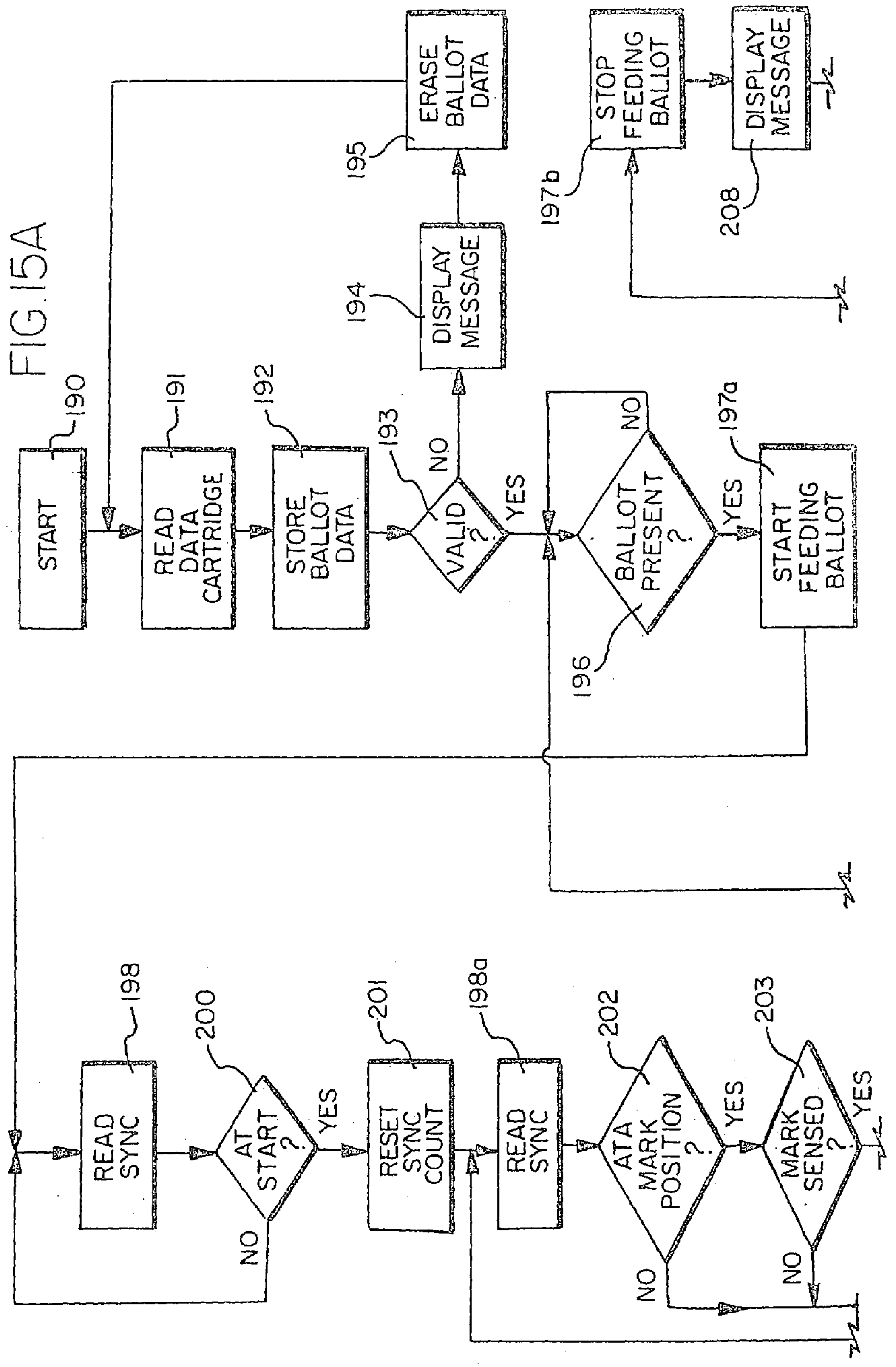
Figure 15B:
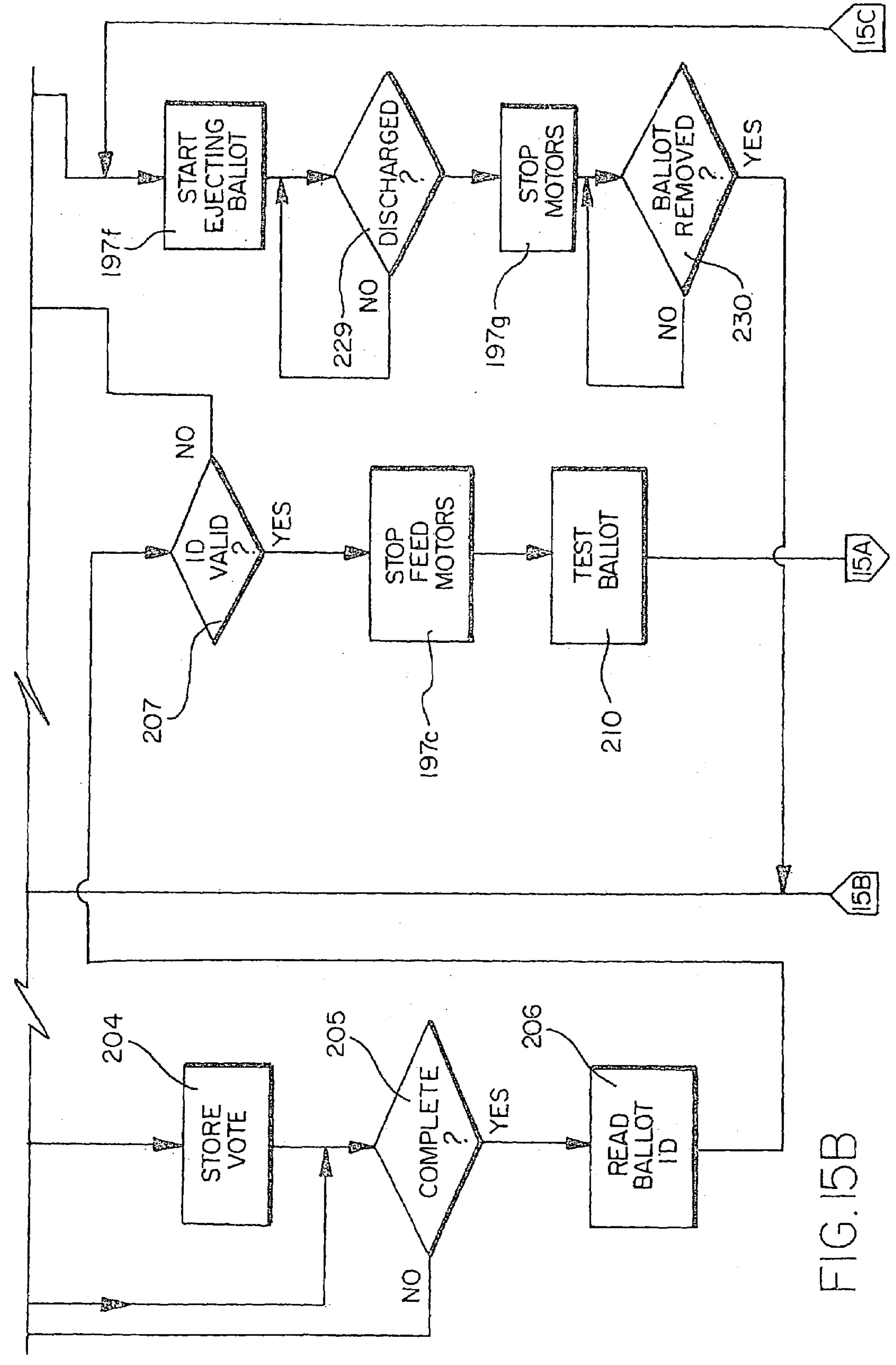
Figure 15C:
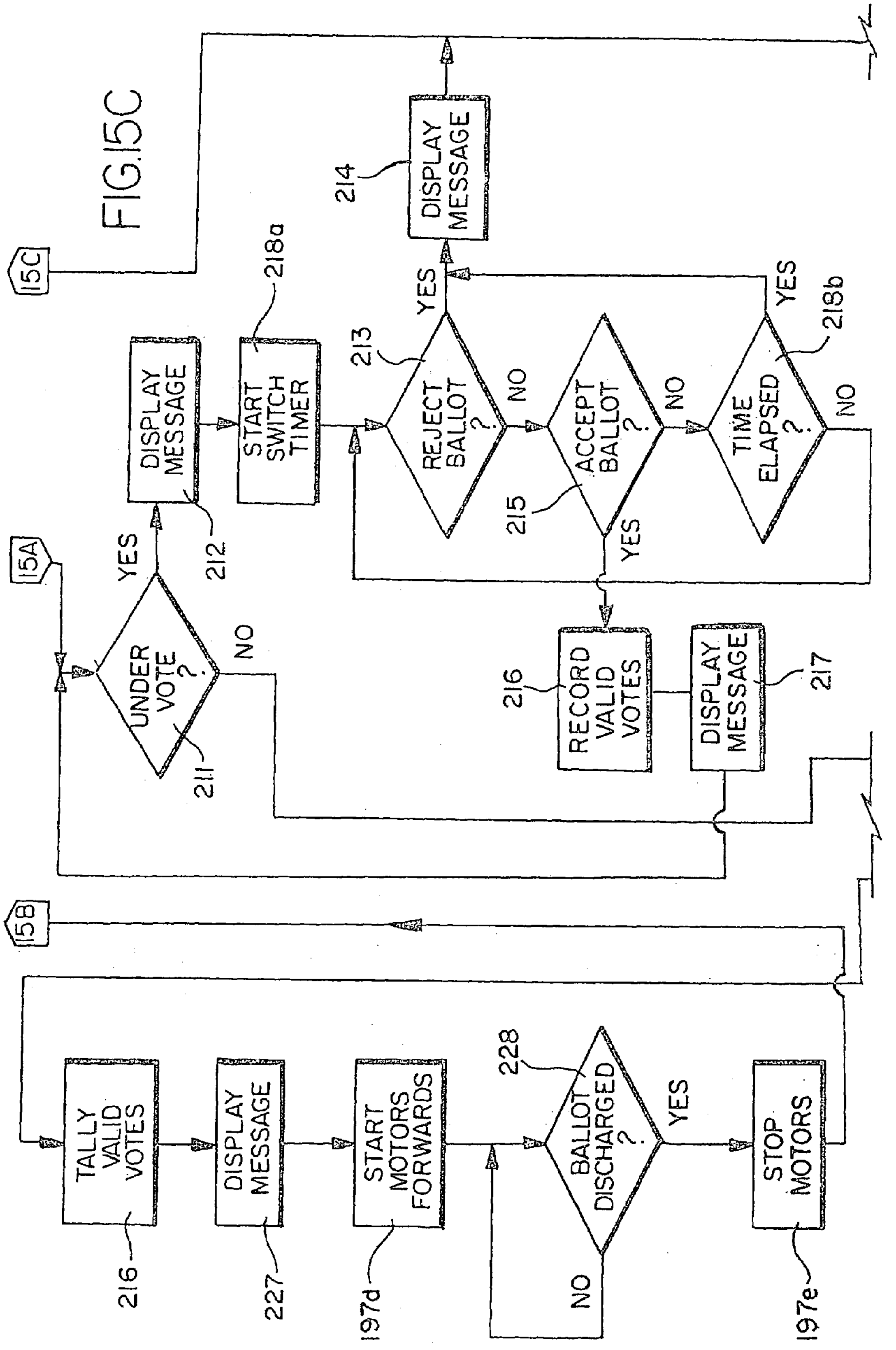
Figure 15D:
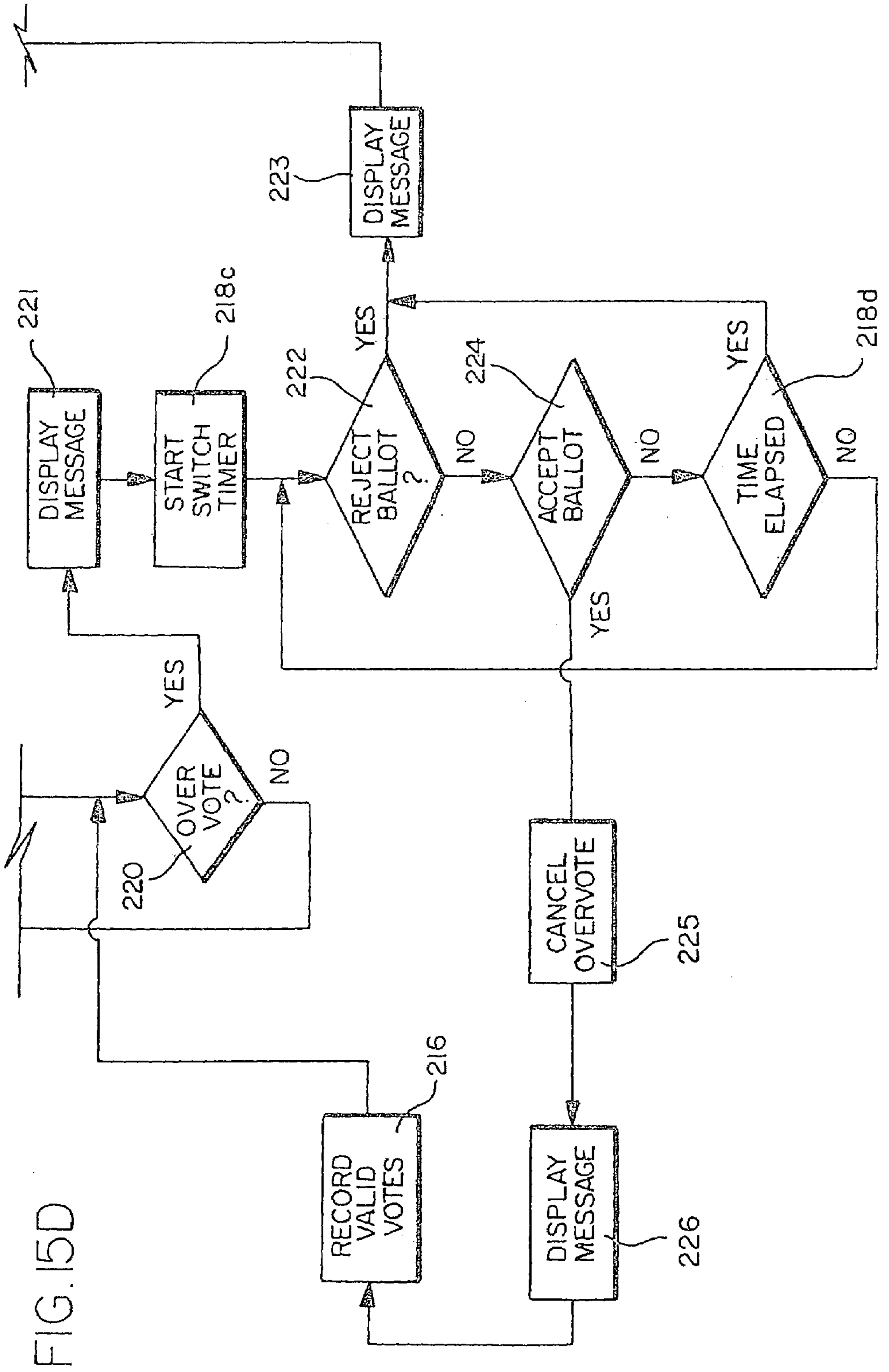

FIGS. 14A–14C provide a simplified flow chart illustrating the principal operating steps which occur during operation of the ballot marking device utilized in the voting system of FIG. 1.

FIGS. 15A–15D provide a simplified flow chart illustrating the principal operating steps which occur during operation of the ballot scanning device utilized in the voting system of FIG. 1.

Figure 16:
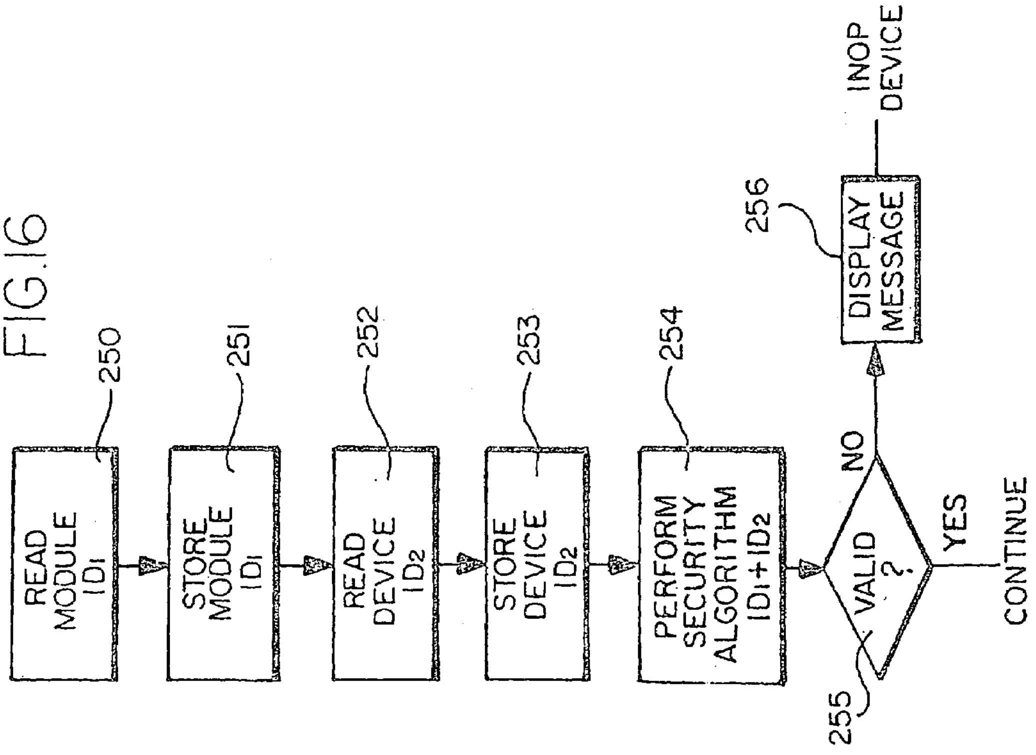

FIG. 16 provides a simplified flow chart illustrating the principal operating steps which occur in the implementation of a security system in the voting system of FIG. 1 to assure that only an authorized ballot data module is used in conjunction with a particular marking or scanning device.

Figure 17:
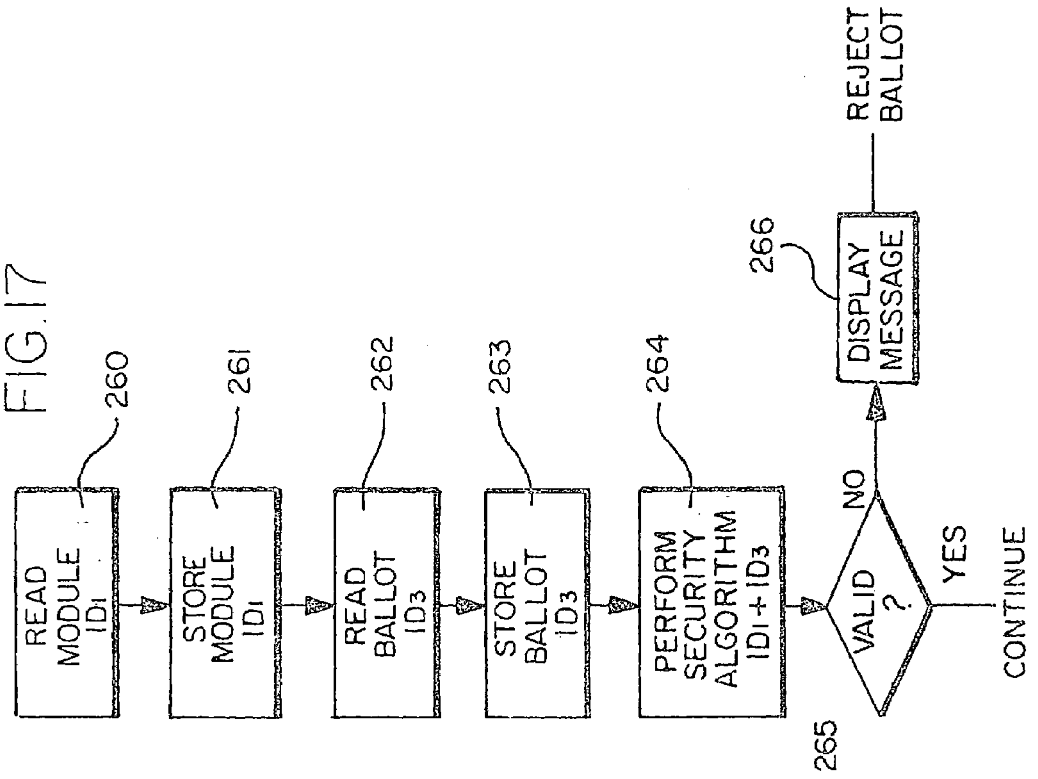

FIG. 17 provides a simplified flow chart illustrating the principal operating steps which occur in the implementation of a security system in the voting system of FIG. 1 to assure that only authorized ballots are processed by a marking or scanning device in which a particular ballot data module is installed.

Figure 18:
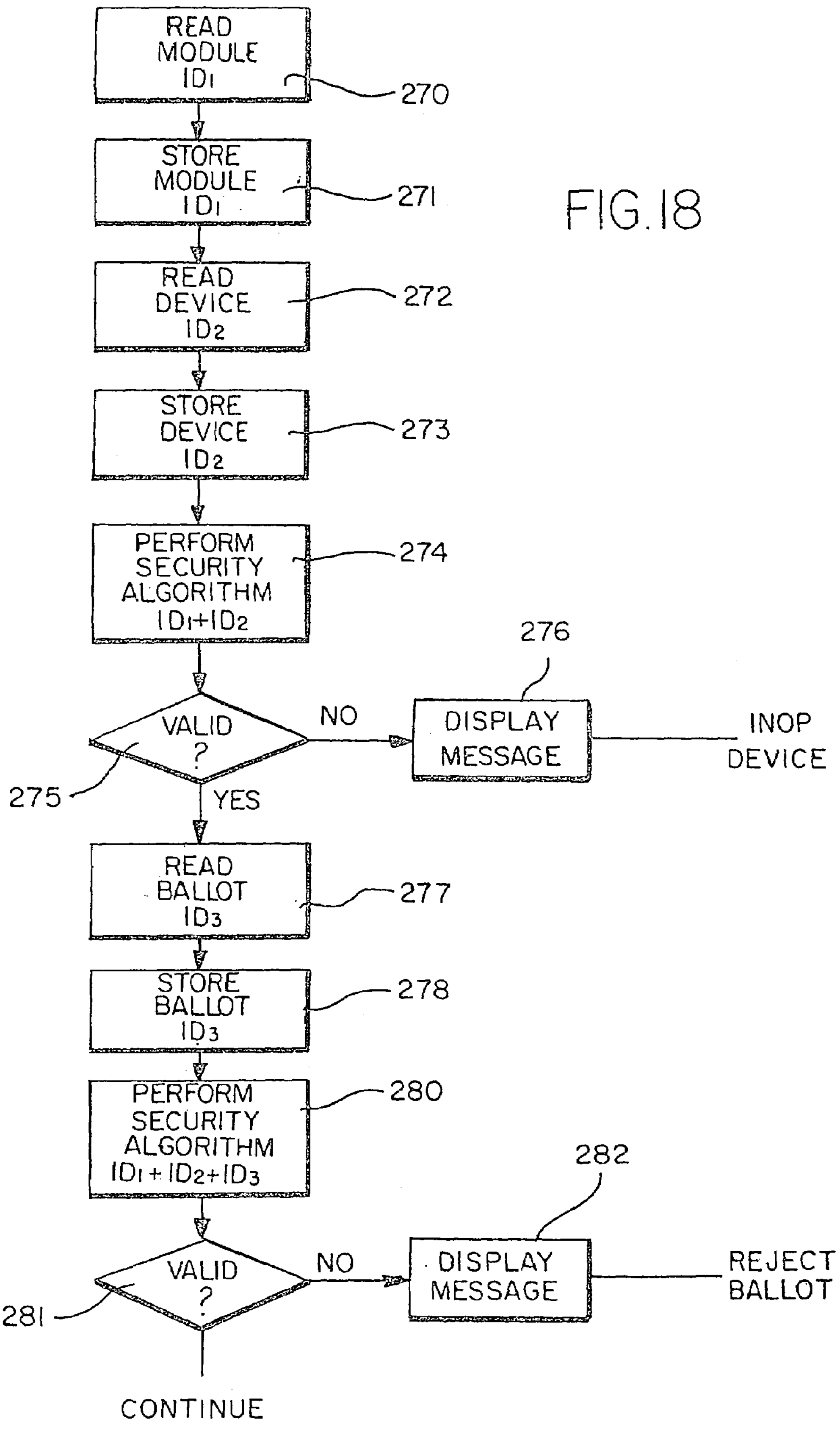

FIG. 18 provides a simplified flow chart illustrating the principal operating steps which occur in the implementation of a security system in the voting system of FIG. 1 to assure that only an authorized ballot data module is utilized with a particular scanning or marking device, and that only authorized ballots are processed by the authorized devices and ballot data modules.

Figure 19:
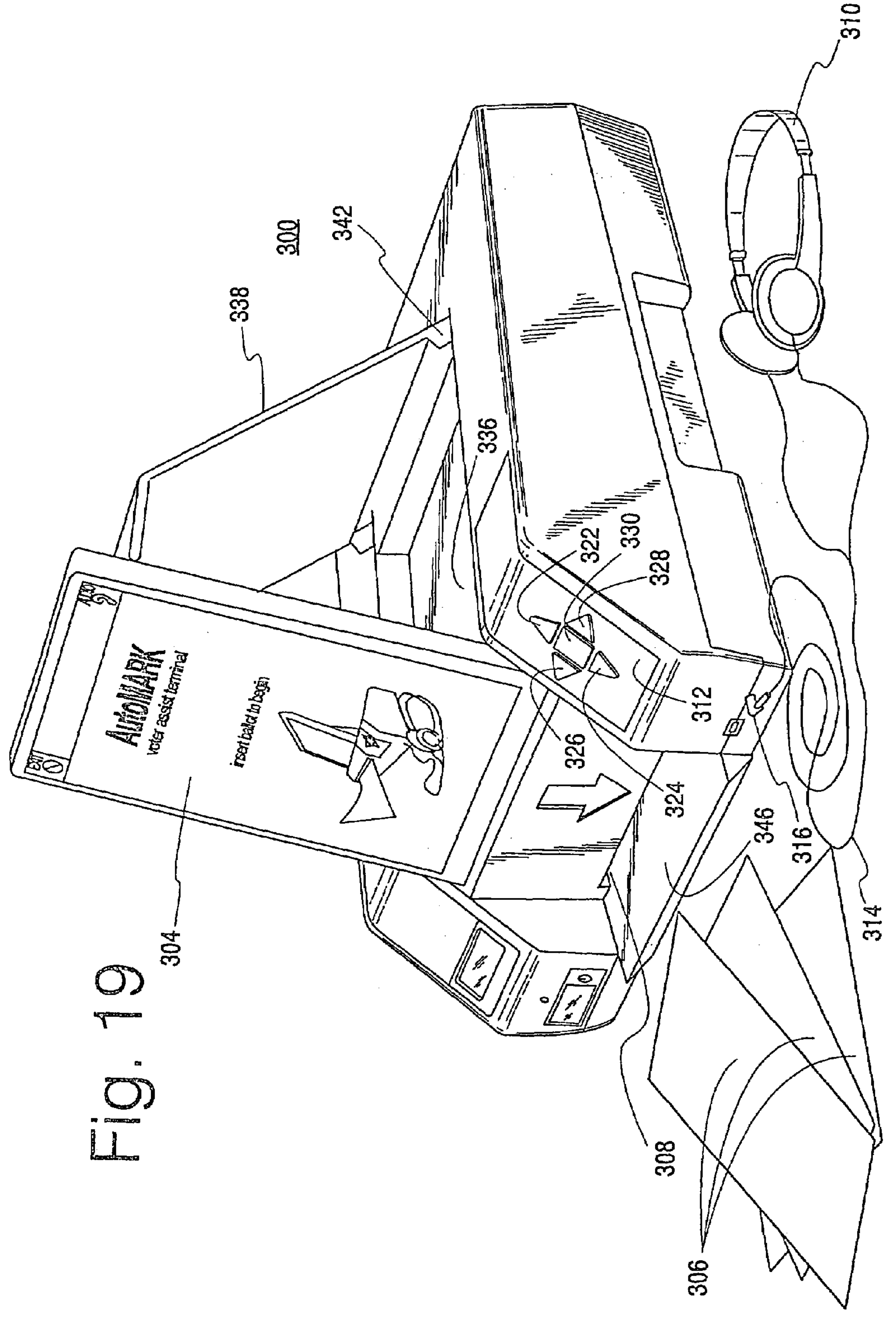

FIG. 19 is a perspective view of an alternate embodiment of the voter assistance terminal for use according to the voting system of the present invention shown in its open and ready to use position.

Figure 20:
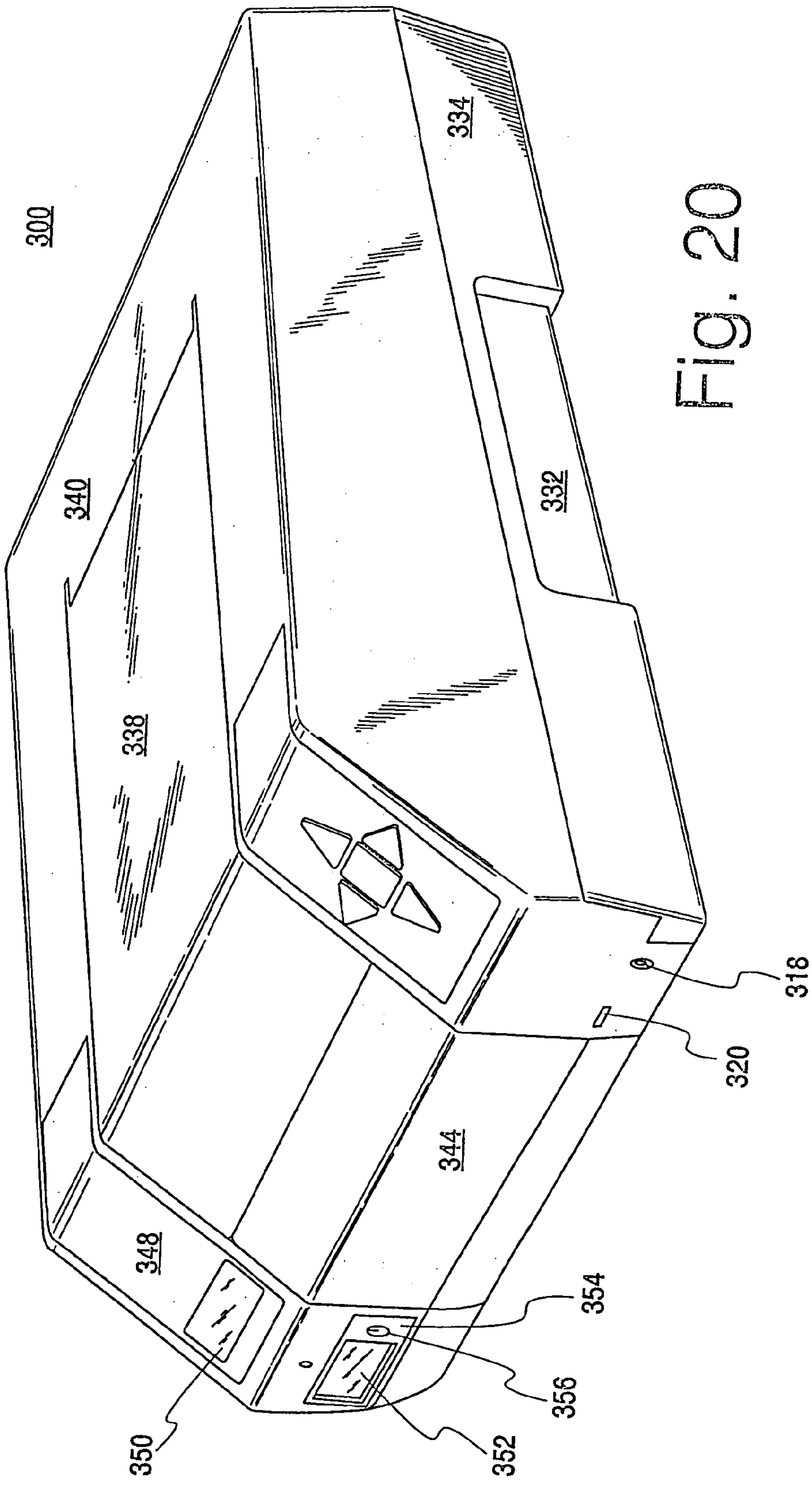

FIG. 20 is a perspective view of the voter assistance terminal of FIG. 19 shown in its closed position.

Figure 21:
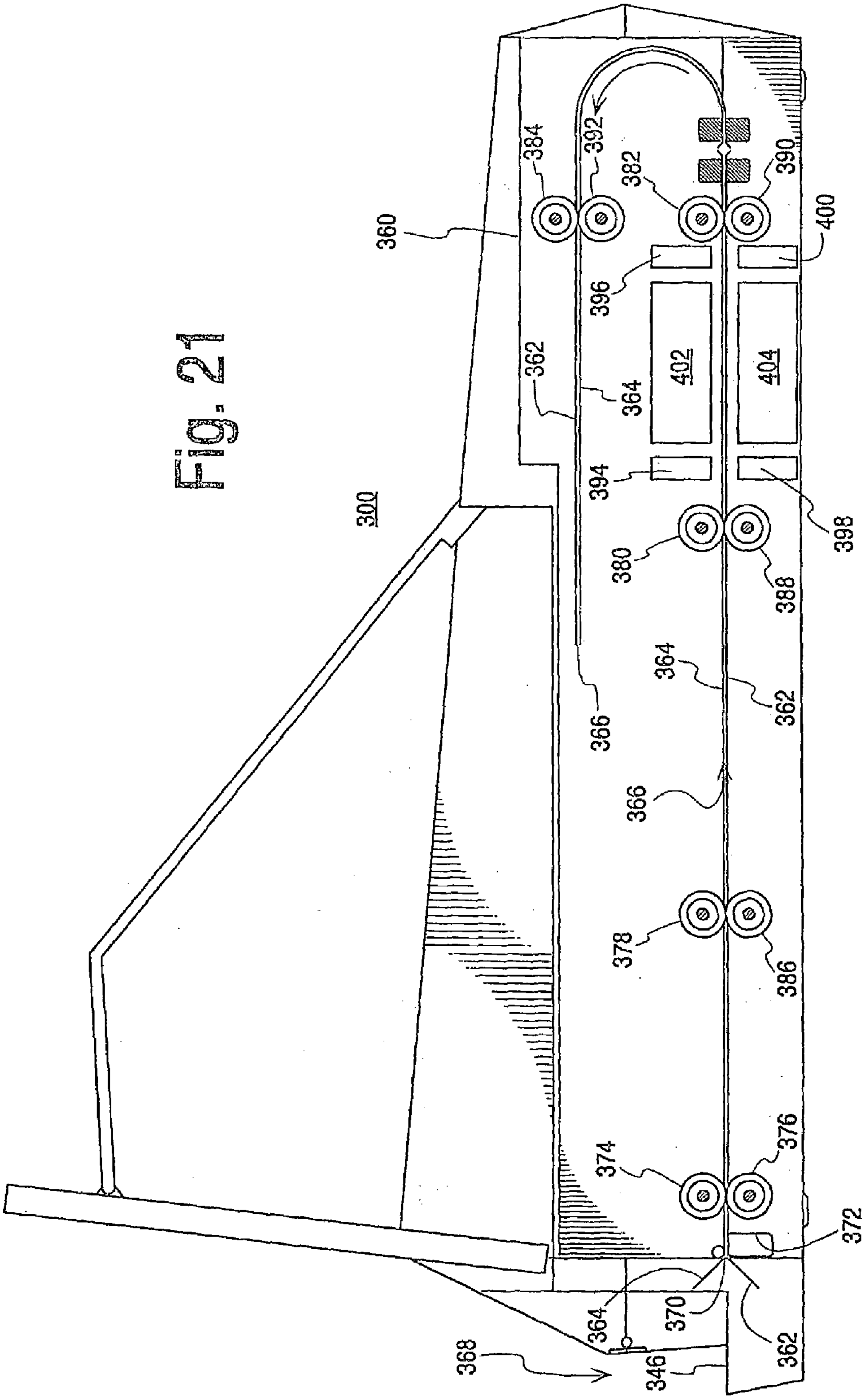

FIG. 21 is a cross-sectional side view of the voter assistance terminal of FIG. 19 showing the principal components utilized for the ballot path.

FIGS. 22*a*–22*d* are a series of diagramatic cross-sectional side views showing the path of a physical ballot as it traverses the ballot path within the voter assistance terminal of FIG. 21.

Figure 23:
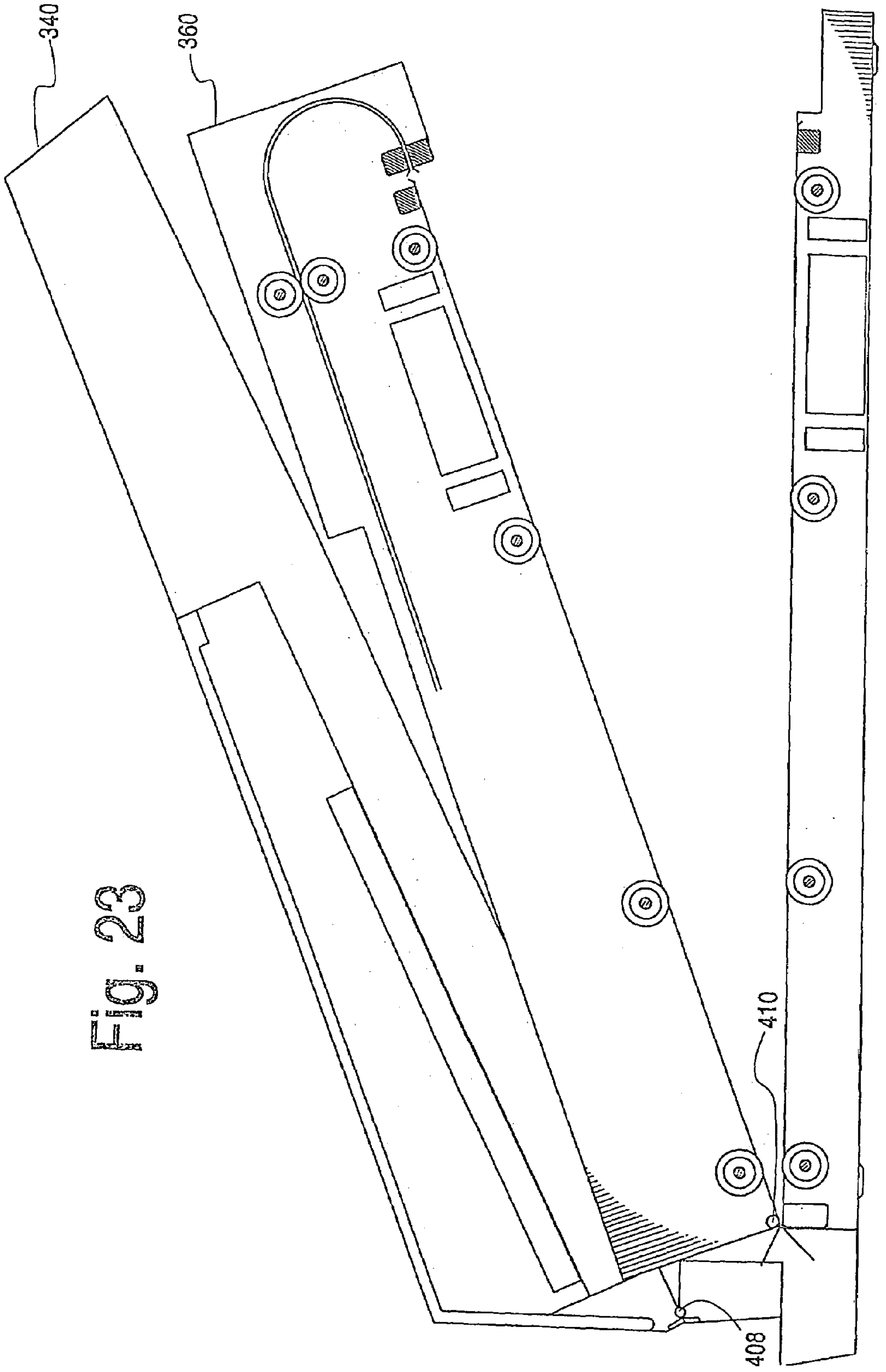

FIG. 23 is a cross-sectional view showing the pivotable features of the voter assistance terminal of FIG. 21 to facilitate the service thereof.

DESCRIPTION OF THE PREFERRED EMBODIMENT

Referring to the drawings, and particularly to FIG. 1, a voting system 19 constructed in accordance with the invention is seen to basically include a paper ballot 20, an electronic voter-assistance station 21 comprising a ballot marking device 22 and voting terminal 23, a ballot scanning device 24 and a ballot box 25. A first removable ballot data module 26 is preferably provided for configuring marking device 22, and a second removable ballot data module 27 is preferably provided for configuring scanning device 24 to a particular ballot format. Marking device 22 is connected to voting terminal 23 by a flexible cable 28 which may have conventional connectors (not shown) at one or both ends to facilitate disassembly and transport of the voting system.

In use, an election judge at 30, after confirming the identity and registration of a voter, issues a paper ballot 20 at a ballot issuing station 31. The voter, after physically receiving the ballot, has the option either of manually marking the ballot at a conventional voting booth 32, or of inserting the ballot into a ballot receiving slot 33 at the front of marking device 22 of voter-assistance station 21 for electronic marking. In the later event, the ballot is received and positioned within the marking device, and voting choices appropriate to the ballot are presented to the voter on successive viewing screens on voting terminal 23. In particular, the voting selections are preferably presented on a color liquid crystal touch-screen display panel 34, one slate of candidates for an office at a time, under control of processors contained within marking device 22 and voting terminal 23. With each office voted, a check is automatically made to determine if the voter has under-voted (failed to vote for a candidate in that office) or over-voted (voted for two or more candidates for that office). In the event of such an under-vote or over-vote, additional choices are presented to the voter on touch-screen 34 to give the voter an opportunity to correct the voting error. In the event the error is not corrected within a predetermined period of time, or in the event the voter fails to vote within a predetermined period of time, the voting process is terminated and the ballot held in marking device 22 is rejected and returned to the voter through slot 33.

Once the voter has made a selection for each candidate on the ballot, the voter indicates his satisfaction with his choices by actuating a vote option on touch-screen 34, causing marking device 22 to mark ballot 20 with voter-detectable marks in appropriate marking spaces 35 (FIG. 6) associated with the respective candidates listed on the ballot. In accordance with one aspect of the invention, the marking is done such that the same marking spaces 35 are marked as would have been marked by the voter had the voter manually marked the ballot at voting booth 32.

As ballot 20 is being marked, it is discharged from marking device 22 through slot 33. The discharged ballot is physically removed by the voter, visually checked for accuracy, and carried to scanner device 24 wherein it is inserted in a slot 36 provided at the front of the device. In the event that ballot 20 has instead been manually marked at voting booth 32, the ballot is similarly inserted into slot 36. The scanning device, after receiving ballot 20, checks the ballot for under-vote or over-votes. In the event none are detected, the ballot is automatically deposited in ballot box 25, which is preferably constructed as described in co-pending application for Letters Patent, application Ser. No. 10/072,093, filed Feb. 8, 2002, entitled Collapsible Ballot Box. Ballot box 25 preferably includes separate compartments 37 and 38 (FIG. 4) for non-write-in and write-in ballots, respectively.

To assist the voter, marking device 22 may include a message display window 40 utilizing liquid crystal or other known color display technology for displaying marking device status and issuing prompts and instructions to the voter, and a pair of push-button switches 41 and 42 for receiving instructions from the voter. Similarly, scanner device 24 may include a message display window 43 for displaying scanner device status and voter instructions, and a pair of push-button switches 44 and 45 for receiving voter instructions.

Figure 2:
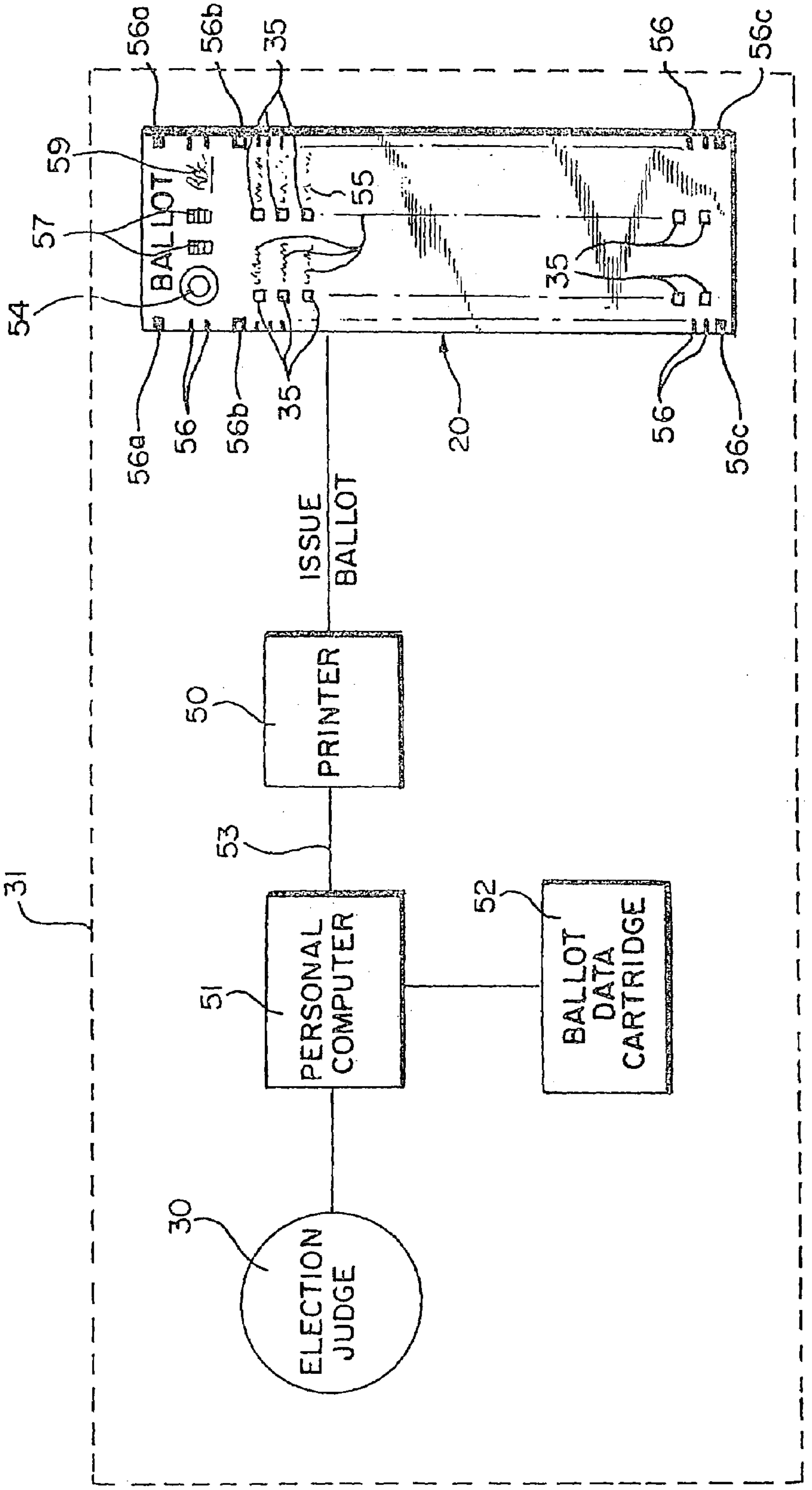
FIG. 2 is a simplified block diagram showing an alternative ballot issuing station for use in the voting system of FIG. 1.

Referring to FIG. 2, the voter registration station 31 may alternatively utilize a printer 50 for printing ballots 20. In particular, printer 50, which is preferably a laser-type printer, is driven by a personal computer 51. Computer 51, which may be either a desktop or a laptop, is preferably provided with an input adapted to read a ballot data module 52 containing ballot format data for one or more voting jurisdictions being processed at a polling place. For example, ballot data module 52 may contain formats for each ward in a multiple-ward precinct. Then, once this data has been transferred from data module 52 to computer 51, upon identification of the voter and his or her ward, it is only necessary for the election judge to input the ward identification. Computer 51 refers to the stored ballot format data from ballot data module 52 to print a ballot 20 of correct format, i.e., having the correct candidate choices, for that voter. A further optional function of computer 51 is to store the names of all of the registered voters for each ward, thereby enabling the election judge to merely input a voter's name. The computer then would automatically verify the registration of that voter and print a ballot in a format appropriate for the voter.

Appropriate security provisions in the form of a PIN (personal identification number) entered into computer 51 by the election judge prior to printing the ballot may be provided to prevent voter fraud. Computer 51 may be connected by a cable 53 to laser printer 50, which is preferably pre-loaded with a supply of paper compatible with the ballot format. The paper stock may be preprinted with an official seal 54 and/or with a watermark for additional security. However, it is anticipated that at least the candidates' names, generally designated 55 in FIG. 2, sync marks 56, and associated marking spaces 35, would ordinarily be printed by laser printer 50.

Sync marks 56 may be provided along one or more edges of ballot 20 to assist ballot marking device 22 and ballot scanning device 24 in generating and reading marks in ballot marking spaces 35. In addition, the ballot type, i.e. the particular ward or voting jurisdiction for which the ballot is intended, together with an optional ballot security ID number, may be indicated by one or more printed bar codes 57 at a predetermined location on the ballot. As will be explained, these bar codes are read by marking device 22 and scanning device 24 in processing ballot 20 to identify the type, and hence the format, of the ballot being processed.

The pattern of sync markings 56 may be modified to provide index points along the ballot. In particular, such index marks may include, for example, a start mark 56*a* at the top of the ballot, a header mark 56*b* between the ballot header portion and the ballot candidate selection portion of the ballot, and an end mark 56*c* at the bottom of the ballot. The index marks preferably differ from each other and from non-index sync marks 56 in thickness and/or spacing to enable the index marks to be sensed by the same sensors in marking device 22 and scanning device 24 which read the sync marks.

Referring to FIG. 3, the mechanism within marking device 22 for receiving, marking, sensing and discharging ballot 20 may comprise a pair of generally parallel-spaced thin metal plates 60 and 61 which define between their co-facing surfaces a paper channel 62. The plates diverge toward the front end of the printer to define ballot receiving slot 33, the bottom plate 61 providing a surface on which the voter places the ballot prior to sliding ballot 20 into the slot. A slot 63 in top plate 60 allows a first sync detector 64, preferably in the form of a light source and photocell focused on the underlying ballot surface, to detect the presence of index mark 56*a* (FIG. 6) on the edge of the ballot, thus determining that a ballot has been inserted through slot 33. This causes a pair of ballot-positioning feed rollers 65 and 66, rotatably driven by a pair of ballot feed drive motors 67 and 68, respectively, to advance ballot 20 along paper channel 62. To this end, feed rollers 65 and 66 are paired with opposing feed rollers 70 and 71 (FIG. 4), respectively. Feed rollers 65 and 70 contact the top and bottom surfaces of the ballot through apertures 72 and 73 (FIG. 4), respectively, and feed rollers 66 and 71 contact the top and bottom surfaces of the ballot through apertures 74 and 75, respectively. Feed rollers 65, 66, 70 and 71 may be conventional in design and construction, having a rubber ballot engaging surface and being spring-biased into contact with the ballot in a conventional manner. For reliable paper handling, conventional rotation sensing means in the form of circumferentially segmented discs 76 and 77 (FIG. 3) and optical segment detectors 78 and 79 may be provided to generate signals confirming rotation of feed motors 67 and 68, and hence paper-positioning feed rollers 65 and 66, respectively.

As feed motors 67 and 68 rotate, ballot 20 advances until a second sync detector 80 senses through an aperture 81 the passage of index mark 56b (FIG. 6), signifying that the ballot has advanced to a predetermined stop position between plates 60 and 61. At this point, feed motors 67 and 68 are stopped and the ballot remains stationary.

Referring to FIGS. 9 and 10, the voter is now presented with successive interactive displays on touch-screen 34 of voter terminal 23 which enable him or her to record his or her candidate choices. Communication between marking device 22 and voting terminal 23 coordinates the ballot presentation, the screens being generated by a display processor 82 utilizing data derived from either ballot data module 26 or an optional ballot data module 84, and stored in a Random Access Memory (RAM) 83 associated with display processor 82. Voter selections made by the voter on touch-screen 34 are stored in RAM 83 for subsequent use in marking the ballot. A marking device interface circuit 85 provides communication with marking device 22 to coordinate the voting protocol with the handling of ballot 20 by the marking device. An uninterruptible battery back-up power supply (UPS) 86 within voter terminal 23 assures that the voting process can continue even during an AC line interruption. A pair of status lights 87, indicating AC or battery operation, are provided to confirm the power-up status of the terminal.

To determine which ballot format is to be presented to the voter on touch-screen 34, bar-code readers in the form of optical mark sensors 88*a* and 88*b* read ballot bar codes 57 (FIG. 6) through an aperture 89 in top plate 60. Ballot information provided by the bar codes is utilized by appropriate software in a processor 90 (FIG. 3A) to select the correct ballot format from multiple formats stored in a RAM 91 associated with processor 90 utilizing data obtained from ballot data module 26. As will be explained, for protection against voter fraud, the bar codes may also provide a ballot ID which is matched with an identification code associated with each ballot format in data module 26 prior to presenting the ballot choices to the voter. In the event there is no match, the ballot is rejected by marking device 22 and returned to the voter without voting terminal 23 being functional. Ballot marking device 22 preferably includes an uninterruptible battery back-up power supply (UPS) 92 for supplying power to processor 90, drive roller motors 67 and 68 and the other components of the marking device to enable the voting process to continue in the event of power interruption.

A voting station interface circuit 93 cooperates with marking device interface circuit 85 to establish communication between processor 82 and processor 90 to coordinate operation of voting terminal 23 with operation of marking device 22, including conveying ballot format data from ballot data module 26 to RAM 83 in the event such data is not provided by a separate data module 84.

To provide voter-detectable marks in appropriate marking spaces 35 (FIG. 6) on ballot 20 following completion of the voter's selection on voting terminal 23, marking device 22 includes a pair of marking heads 94 and 95 (FIGS. 3 and 4) which engage the top surface of the ballot through apertures 96 and 97, respectively. Various types of marking heads may be employed for this purpose, including, for example, ink jet-type and impact-type print heads for producing a visually-detectable mark, or punch-type heads for producing an embossment, dimple or perforation tactilely detectable mark. A pair of mark sensors 98 and 99 are paired with marking heads 94 and 95, respectively, to confirm that each has marked ballot 20 in response to marking signals provided by processor 90 through marking head drive circuits 100 and 101 (FIG. 3A), respectively.

When the voter completes his voting session on terminal 23 by providing an appropriate input on touch-screen 34, ballot feed motors 67 and 68 are caused to operate in reverse to back ballot 20 out of the marking device. As the ballot backs out, processor 90, in response to the ballot position-identifying sync marks 56 on the ballot, causes marking heads 94 and 95 to be actuated as required to mark candidate selection spaces 35 on the ballot in accordance with the voter's selections on touch-screen 34. Mark detectors 98 and 99 independently verify that the print heads have functioned, signaling processor 90 to stop the ballot in position and sound an alarm in the event of a malfunction. The marks made by marking heads 94 and 95 on ballot 20 are user-detectable as well as machine-detectable, allowing the voter to independently verify that the ballot has been marked in accordance with his selections on touch-screen 34.

Ballot feed motors 67 and 68 may in practice be stepper motors driven by a conventional stepper motor drive circuit 102 (FIG. 3A). The feedback signals generated by rotation sensing detectors 78 and 79 are applied to drive circuit 102 to verify motor rotation in a manner well known to the art.

A similar arrangement of ballot marking heads and mark detectors may be provided for the bottom surface of the ballot, allowing both sides of a double-sided ballot to be processed simultaneously. In the present embodiment, additional sync detectors 103 and 104 (FIG. 3A) detect sync marks along a bottom edge of the ballot through apertures 105 and 106 in bottom plate 61 (FIG. 4), respectively. A pair of marking heads 107 and 108 (FIG. 3A) are paired with mark detectors 110 and 111 to mark and sense marks on the bottom of ballot 20 through aperture 112 (FIG. 4). Conventional marking head driver circuits 113 and 114 (FIG. 3B) provide drive signals to marking heads 107 and 108, respectively.

The ballot processing mechanism functioning in FIGS. 1–3B as marking device 22 may also function as ballot scanning device 24. When functioning as a scanning device no voting terminal is connected and alternate operating software is provided for processor 90. In operation as ballot scanning device 24, an initial message 11A may be provided on display screen 43 prompting the voter to insert the marked ballot. Upon sync sensor 64 sensing insertion of a ballot, processor 90 causes ballot feed motors 67 and 68 to advance ballot 20 through paper channel 62. As the ballot advances, mark sensors 98 and 99 sense marks in respective columns of marking positions 35 on the ballot as sync marks 56 are read by sync detectors 64 and 80, the sensed mark locations being stored in RAM 91.

Figure 11A:
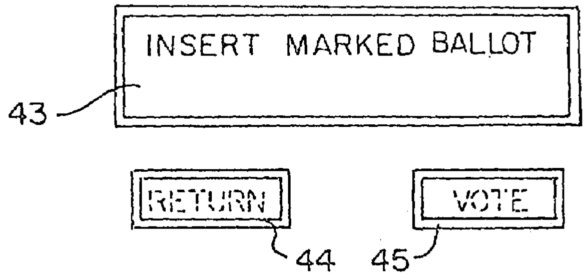
Figure 11B:
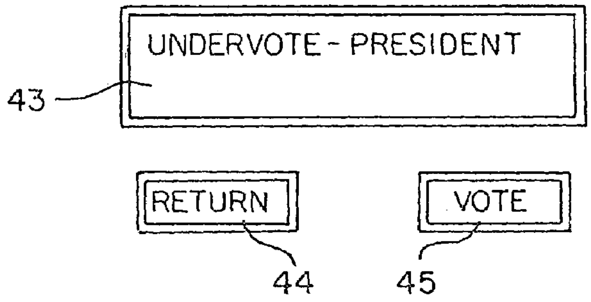
Figure 11C:
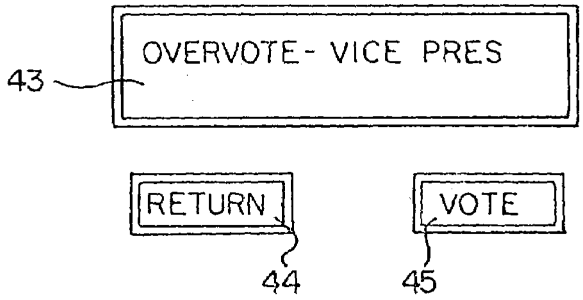
Figure 11D:
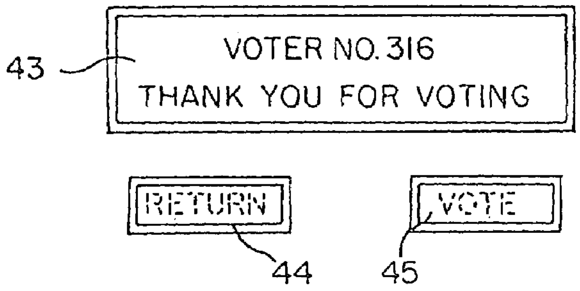
Figure 11E:
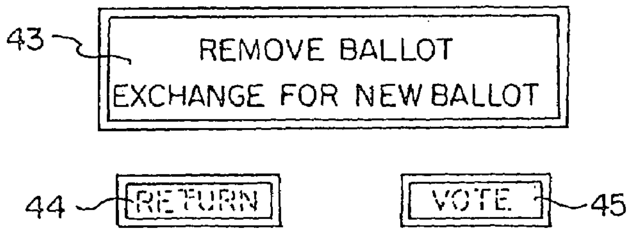

When the ballot has been read, as sensed by the passage of index mark 56*c* (FIG. 6) at sync detector 64, feed motors 67 and 68 are stopped and the ballot is held in position. The sensed mark locations are then compared with the ballot format provided by ballot data module 27 in RAM 91 for the ballot type read by bar-code readers 88*a* and 88*b*. In the event of an under-vote or an over-vote, a message is provided on bar-code display 43 (FIG. 7) indicating the under-vote or over-vote, and push-button switches 44 and 45 are illuminated to allow an interactive selection by the voter. Preferably, in the event of an under-vote, a red flashing display may read as shown in FIG. 11B, requiring either 1) the actuation of vote switch 45, which will cause the under-vote to be erased in RAM 91 and, provided no other under-votes or over-votes are present, the ballot to be discharged into ballot box 25, or 2) the actuation of return switch 44, which will cause all votes on that ballot to be deleted in RAM 91, feed motors 67 and 68 to operate in reverse, and the ballot to be returned to the voter for further voting. Print heads 94, 95, 107 and 108 may be optionally operated during the return of the ballot to void the ballot, as by printing over all marking spaces, or by printing over the ballot ID 57 by means of an additional marking head (not shown), requiring the voter to request a new ballot. In the event of a returned ballot, display 11E may appear, prompting the voter to remove and re-mark the ballot.

In the event of an over-vote, a red flashing message 11C prompts the voter to either 1) actuate put-button VOTE switch 45, in which event the over-vote is deleted from RAM 91, and, provided no other under votes or over votes are present, the ballot is discharged into ballot box 25, or 2) actuate pushbutton RETURN switch 44, in which event the ballot is returned for correction by the voter and message 11E is displayed. The ballot may be optionally voided as previously described, requiring the voter to obtain a new ballot. In the event of an accepted ballot, a steady green display 11D is provided. When no action is required by the voter, push-button switches 44 and 45 remain unlit and preferably display no indicia.

Similar interactive color display messages may be provided on display 40 of ballot marking device 22. Initially, an amber display (FIG. 12A) may prompt the voter to insert an unmarked ballot. When the ballot is in place and while the voter is using terminal 23, a steady red message (FIG. 12B) may be displayed. When voting is complete, a flashing red message may be displayed to prompt the voter to remove the machine-marked ballot and take the ballot to scanner device 24. When the mechanism is functioning as a ballot marking device, push-button switches 44 and 45 are preferably inoperative, unlit and display no indicia.

To enable vote tallies to be transmitted to a central processing location upon poll closing, a communication port 115 (FIG. 3A) and modem 116 may be provided which, under control of processor 90, causes an appropriate signal to be transmitted indicative of the tallies. Various security provisions are possible, including encryption through the use of an embedded electronic serial number (ESN) in processor 90 and ballot data module 26, which serial numbers are required to be transmitted and received at the central processing location before ballot tallies, preferably encrypted, are received as authentic election results.

An additional function which may be required of ballot scanning device 24, but not of ballot marking device 22, is that the ballot, after processing, is selectively discharged into one or two compartments 37 and 38 within ballot box 25, depending on whether the ballot contains write-in votes. To this end, when a mark is sensed in a marking space on a write-in vote line, as indicated by the data provided by data module 27 and stored in RAM 91, a ballot routing gate 117 (FIGS. 3 and 4) is positioned by an actuator motor 118 to a position which will discharge the ballot into the appropriate compartment. A rotation sensor in the form of a circumferentially segmented disc 119 and optical rotation sensor 120, provide a feedback signal to a conventional stepper motor drive circuit 121, which causes gate 117 to be positioned as determined by processor 90.

The operating mode of the marking and scanning devices is controlled by a key-operated mode switch 122 on the front panel 123 (FIG. 13) of the devices. The switch selects one of four operating modes: OFF, MARK, SCAN and REPORT. In the MARK mode, the apparatus functions as a marking device to mark the ballot in accordance with vote selections read at voting terminal 23. In the SCAN mode, the apparatus functions as a scanning device to check marked ballots for under-votes and over-votes and then tally and deposit the ballots in a ballot box. In the REPORT mode, which is normally used following closing of the polls, vote tallies are transmitted as an encrypted message to a central vote-counting location.

Other features provided on front panel 123 include a key-operated locking mechanism 124 for locking the device to a supporting surface, in the case of marking device 22, or to a ballot box, in the case of scanning device 24. As shown in FIG. 5, the locking mechanism 124 may consist of a cylinder-type key lock, having a locking arm 125 which engages a slot 126 in the underlying surface. One or more tabs 127 engage the housing of the printer or scanner through appropriately located slots 128.

The front panel may further include an identification plate 130 (FIG. 13) which may contain a permanent device serial number or other identifying indicia, and/or a user-removable identification card by which the scanning device is identified as the property of a particular jurisdiction. Also, a lockable module receiving receptacle 131 may be provided for receiving ballot data modules 26 or 27.

Preferably, as shown in FIG. 8, receptacle 131 comprises a compartment 132 within which the module is slidably received. A connector 133 at the rear end of the compartment provides connections with a printed circuit board 134 within the module. A handle 135 may be provided integral with the module housing to assist in removing the module. A hinged door 136 (FIGS. 7 and 13) secured by a key lock 137 may be provided to prevent tampering with the data module. A window 138 in door 136 may be provided to enable viewing of a module identification number on the handle of the module. A pair of LED pilot lights 139 (FIGS. 7 and 13) provide a steady indication to indicate whether the unit is operating on AC or battery power, and a blinking indication in the battery mode to indicate a low-battery condition.

As best shown in FIG. 6, the ballot voting spaces 35 are preferably arranged in columns 140 on ballot 20 so as to be in alignment with the optical marking sensors and marking heads of marking device 22 and scanning device 24. While two columns are shown in FIG. 6, it will be appreciated that a greater or lesser number of columns may be provided to accommodate a greater or lesser number of candidate selections on the ballot. In such cases a like number of mark sensors and marking heads would be provided within the marking and scanning devices.

The basic operation of marking device 22 is illustrated by the simplified flow chart of FIGS. 14A–14C. Initially, upon power up of the printer, a start sequence 150 results in data being read from data module 26 at 151. This data is stored at 152 in RAM 91 within marking device 22. Provided the data from data module 26 tests valid at 153, an inquiry is made at 154 whether a ballot has been inserted into ballot receiving slot 33. In the event the data from data module 26 tests invalid at 153, a message is generated at 155 for display on display screen 40 and the stored data is erased from RAM 91 at 156.

Upon a ballot being sensed at 154, ballot feed motors 67 and 68 are caused to turn in a forward direction at 157*a* to receive the ballot and ballot sync marks 56 are read at 158 to monitor the movement of the ballot through paper channel 62. As sync pulses are read, the ballot ID is read by bar code readers 88*a* and 88*b* at 160. The sensed bar code is tested at 161 for validity against a ballot ID received into memory from data module 26. In the event of an invalid ID, a message is generated at 162 for display on message display 40 and the ballot feed motors are initially stopped and then reversed at 157*b* to reject the ballot.

If the ballot tests valid at 161 and sync marks 56 indicate at 163 the ballot has reached an initial position for marking, the ballot feed motors are stopped at 157*c* and a message is generated at 164 for display on message display 40. The voter assistance routine is then performed by voting terminal 23 at 165, in accordance with ballot format stored in RAM 91 and communicated to the voting terminal through cable 28. Upon completion of the voter assistance routine at 166, the voter's candidate selections are recorded in RAM 91 at 166, a message is generated at 168 for display on display 40, and the ballot feed motors are caused to turn in a reverse direction at 157*d*. In the event that voting is not complete after a period of time starting at 170*a* and ending at 170*b*, a message at 171 is displayed on display 40 and the ballot feed motors are caused to turn in a reverse direction at 157*b* to discharge the ballot.

As ballot 20 backs out of marking device 22 from its initial printing position, sync markings are read at 172, stored user candidate selections are recalled from memory at 173 and, where at 174 a mark is required by the stored selection, marking heads 94, 95, 107 and 108 are actuated at 175 to place voter-readable and machine-readable marks at the marking spaces 35 associated with the voter-selected candidates. Following each marking, the associated one of mark sensors 98, 99, 110 and 111, respectively, test for proper printing at 176. In the event a printing malfunction is sensed, an alarm is sounded at 177*a*, a message is generated at 177*b* for display on message display 40 and the ballot feed motors are stopped at 157.

If all print marks check valid and the printing tests complete at 178, a message is generated at 180 on message display 40 and reverse operation of the ballot drive motors continues at 157*f* until the ballot is sensed at 181 to be discharged through slot 33. If printing is not complete, then sync marks continue to be read at 172 and the previously described print cycle continues. Once the ballot feed motors have been stopped, further movement of the feed motors is prevented at 157*g* until the ballot has been removed at 182 by the voter.

The operation of scanning device 24 is described by the simplified block diagram of FIGS. 15A–15D. Upon initiation of the operation sequence at 190, data from ballot data module 27 is read at 191 and stored in RAM 91 at 192. The data supplied by data module 27 is tested for validity at 193. In the event the data module is found to be invalid, a message is displayed at 194 for display on message display 43 and the stored data is erased at 195 from RAM 91.

In the event the data from data module 27 is valid, a determination is made at 196 whether a ballot is present at ballot-receiving slot 36. If a ballot is present, the ballot feed motors 67 and 68 are caused to operate at 197*a* to advance the ballot through ballot channel 62 and sync marks 56 are read at 198 as the ballot advances. Upon detection at 200 of the ballot having reached an initial reading position, a counter within processor 90 is reset at 201 to track the progress of the ballot. With each incremental movement of the ballot reference is made at 202 to the data stored in RAM 91 to determine whether the ballot is in a position wherein a valid marking space is positioned under one of the mark sensors. In the event a marking space is so situated and a mark is sensed at 203, an input is provided to RAM 91 at 204 of the sensed mark and marking space to record a vote for the candidate associated with that marking space. The process continues until all valid marking spaces have been sensed at 205, at which time the ballot ID code 57 is read at 206 by bar code reading heads 88*a* and 88*b*. In the event the ballot ID is not valid at 207, i.e., the ballot is not appropriate to this scanning device in this voting jurisdiction, the forward progress of the ballot is stopped by stopping the ballot feed motors at 197*b* and a message is generated at 208 for display on message display 43.

If the ballot ID tests valid at 207, the ballot feed motors are stopped at 197*c* and the ballot format is read from memory at 210 to determine whether the ballot has been properly marked for the particular candidate selections presented to the voter. If an under-vote is detected at 211, a display message is generated at 212. Push-button switches 44 and 45 are now enabled. If switch 44 is actuated by the voter signaling rejection of the ballot at 213, a message is generated at 214 for display on message display 43 and the ballot feed motors are caused to operate in reverse at 197*f* to return the ballot to the voter. If the voter actuates switch 45 indicating acceptance of the under-vote at 215, the valid votes contained on the ballot are recorded into a cumulative vote tally memory at 216 and a message is generated at 217 for display on message display 43. In the event the voter fails to actuate either switch 44 or 45 following generation of the under-vote message at 212, the inaction is treated as a rejection after a predetermined time period starting at 218*a* and ending at 218*b*.

In the event an over-vote is sensed at 220, a message is generated at 221 for display on message display 43. Push-button switches 44 and 45 are illuminated and enabled. If the voter chooses to reject the over-vote by actuation of RETURN switch 44 at 222, a message is generated at 223 for display on message display 43 and the ballot feed motors are caused to operate in reverse at 197*f* to return the ballot to the voter. In the event VOTE switch 45 is actuated at 224 to accept the over-vote, the votes constituting the over-vote, i.e., multiple votes cast for a single office, are cancelled from RAM 91 at 225 and the balance of the ballot is entered into the cumulative vote tally AT 216. A message is generated at 226 for display on message display 43. In the event that the voter fails to actuate either push-button switch 44 or 45 following the generation of the over-vote message at 221, the inaction is treated as a rejection after a predetermined period of time starting at 218*c* and ending at 218*d*.

In the event no under-votes or over-votes are present, a message is generated at 227 for display on message display 43 and the movement of ballot 20 is continued at 197*d* through paper channel 62 until discharge of the ballot has been sensed at 228, at which time the ballot feed motors are stopped at 197.

When the ballot feed motors have been caused at 197*f* to return the ballot to the voter, the feed motors continue to operate until the ballot has been discharged through slot 36 as sensed by index mark 56*a* at 229, at which time the feed motors are stopped at 197*g*. Forward operation of the ballot feed motors is prevented at 197 by sensor 64 at 230 to prevent the returned ballot prior to pick up by the voter from being sensed as a newly-inserted ballot.

Various security protocols may be provided in marking device 22 and scanning device 24 to prevent voter fraud. In FIG. 16, a system is shown for allowing only authorized data modules 26 or 27 to be used with a particular marking device or scanning device. In this system each device is provided with an identification number, ID1, which is preferably embedded within a chip associated with processor 90. ID1 may, for instance, comprise a unique 8, 16 or 32 bit number. A ballot data module intended for use with the particular printer or scanner is similarly provided with an embedded identification number, ID2. Upon insertion and reading of the data module at 250, ID1 is stored in RAM 91 at 251. At the same time, ID2 is read at 252 and stored in RAM 91 at 253. A security algorithm receives ID1 and ID2 at 254, validates the numbers at 255, and generates an enabling signal which enables operation of the device. In the event the IDs do not validate, a message is generated at 256 for display on the device message display and further operation of the device is prevented.

A further security protocol may be provided to prevent a data module 26 or 27 from being used with an inappropriate ballot 20. In this instance, as shown in FIG. 17, the module ID1 is read at 260 and stored in RAM 91 at 261. In subsequent operation, ID3 is read from ballot bar code ID 57 at 262 and stored in RAM 91 at 263. A security algorithm is performed at 264 whereby ID1 and ID3 are compared to determine whether their combination is valid at 265. In the event the ballot ID is not appropriate to the module ID, a message is generated at 266 for display on the device message display, and the ballot is rejected. In the event the combination is appropriate, operation of the device continues.

A further security protocol is possible wherein a valid combination of ballot data module, marking or scanning device and ballot is verified. In this routine, as shown in FIG. 18, the data module ID1 is read at 270 and stored in RAM 91 at 271. The device ID2 is read at 272 and stored in RAM 91 at 273. A security algorithm is performed at 274 to verify at 275 that a valid combination of data module and device exists. In the event the module is not appropriate, a message is generated at 276 for display on the device message display and further operation of the device is prevented.

If the ballot data module and device are a valid combination, in subsequent operation the ballot ID3 is read from the ballot at 277 and stored in RAM 91 at 278. A further security algorithm is performed at 280 which verifies that the ID1 of the data module, the ID2 of the device and the ID3 of the ballot are all valid at 281 for processing of the ballot. In the event that the ballot is inappropriate to the combination, a message is generated at 282 for display on the device message display and the ballot is rejected.

Thus, by controlling the imbedded ID numbers of the ballot data module and the device and the ID number of the ballot, the introduction of an inappropriate element into the voting system is prevented. It is anticipated that the ID'S of the data module and marking and scanning devices would be concealed to prevent someone from easily substituting another module or device into the system and thereby achieving erroneous vote tallies.

While a form of marking and scanning apparatus has been described for use with the voting system of the invention, it will be appreciated that such marking and scanning devices may take various forms. For example, a greater or lesser number of rollers may be employed to position the ballot within the device and a greater or lesser number of marking and mark sensing heads may be employed to provide for a greater or lesser number of columns of marking spaces on the ballot. Furthermore, instead of moving the ballot past stationary marking and sensing heads, it would be possible to move the ballot to a stationary position, and then move the marking and sensing heads, preferably arranged horizontally side-by-side on a stepper motor driven carriage, vertically from one end to the other of the ballot, thereby vertically scanning the ballot for markings and marking locations as required.

Furthermore, while data modules have been shown that plug directly into a receptacle in the personal computer, marking device, or scanning device, it will be appreciated that such modules could instead be connected through a cable using a serial data interface, such as, for example, a universal serial bus (USB). Furthermore, while the foregoing description provides that voting data will be stored in RAM memory, it will be appreciated that EEPROM (electrically erasable programmable read-only memory) or flash memory could be used instead.

Furthermore, various types of mark sensing devices can be used in the marking and scanning devices, including one utilizing, a focused light source reflecting from the ballot surface onto a focused detector, and that various known circuits and optical devices can be incorporated to enhance the performance of such mark sensing devices. Furthermore, various forms of print heads can be used as marking heads to mark the marking spaces of the ballot. One form of print head believed advantageous for this purpose and readily available is an impact type involving a single hammer and a replaceable carbon or mylar film ribbon cartridge. However, print heads employing bubble jet or ink jet technology could also be utilized.

It will also be appreciated that various types of alternative media may be used for the physical ballot, including, for example, a thin plastic material, and marking may be accomplished by punching or deforming the material by means of heat, or a mechanical, electrical or magnetic force, it only being necessary for the voter to be able to detect the mark to ascertain that his or her votes have been correctly marked.

Furthermore, while it is recognized that the particular construction illustrated for the apparatus of the marking and scanning devices is advantageous in that it allows the same apparatus to be used for either device, and that the function of the apparatus can be readily changed by selecting different operating systems in processor 90 by a means of a single mode-selecting switch, in practice the construction of the marking and scanning devices need not be identical and can instead be optimized for use in each device.

For example, an alternate embodiment for the construction of a device optimized for marking is illustrated in FIGS. 19–23. Referring to FIG. 19, this voter assistance terminal 300 comprises a ballot marking device 302 and touchscreen or voting terminal 304. The preferred embodiment of this voter assistance terminal 300 provides for the marking device 302 to be connected to the touchscreen 304 via a flexible cable (not shown) which may have conventional connectors to facilitate the closing and transport of the voter assistance terminal 300. (See FIG. 20)

The voter assistance terminal 300 constructed in accordance with this alternate embodiment of the present invention is used as previously discussed. In short, an election judge, after confirming the identity and registration of the voter, issues a preprinted paper ballot 306. The voter has the option of manually marking the ballot 306 in the conventional way, or of inserting it into a ballot receiving slot 308 at the front of the marking device 302 of the voter assistance terminal 300 for electronic marking. The terminal 300 draws in the ballot 306 and scans a preprinted code to determine which form or style of ballot has been inserted. It then presents a series of menu-driven voting choices on its preferably color touchscreen 304 corresponding to that particular ballot style.

In the event that the voter is in need of language support, for example he or she cannot read the English language, the voting menus on the touchscreen 304 can be presented in any number of different languages and then the voter can more readily navigate through these menus. Additionally, in the event that the voter has diminished motor skills, is somewhat visually impaired, or is in some other way physically handicapped and cannot vote in the conventional manner, he or she simply navigates through these touchscreen menus. Furthermore, in the event that the voter cannot use the touchscreen 304 due to the severe physical impairment, blindness or any other reason, he or she can navigate through these menus via a headphone 310 and sub-panel 312 combination. More particularly, a blind voter (for example) would wear the headphones 310 which are connected to the marking device 302 via headphone wire 314 and jack 316 into plug 318. panel comprises, preferably four arrow keys, up 322, down 324, left 326, right 328 and a center enter key 330. The blind voter then navigates through the menus using these keys in conjunction with pre-recorded, digitized audio prompts heard through headphones 310.

It will be understood that additional means of voter menu navigation have been contemplated, for example, a USB port 320 may be provided that would allow voters to bring in their own input devices, such as a puff-blow or foot pedal. In this implementation, the interface provides single switch access which takes place in the same general manner as the touchscreen or sub-panel, but voter responses are limited to YES and NO.

In any event, the voter assistance terminal 300 accumulates the voters choices in its internal memory during this menu driven (visual, audio, or both) navigation. When the voter is finished with his or her choices, he or she is prompted to mark his or her ballot. The preprinted ballot is then marked according to these choices using its internal print mechanisms. The ballot is then fed back to the voter through slot 308 for confirmation and insertion into the scanner, where it is validated and tallied.

Referring now to FIG. 20, the voter assistance terminal 300 is shown in its closed or transport state. In this state, it can be easily carried via handles 332 located on both sides of its lower housing 334. The touchscreen is safely located within recess 336 and beneath the protective cover 338 hinged to the top housing 340 via hinges 342 (FIG. 19). The ballot slot 308 is also safely located behind the lower cover 344 which forms the ramp 346 to aid in the ballot insertion when the voter assist terminal 300 is in the open position.

An additional sub-panel 348 preferably comprises a message display window 350 utilizing liquid crystal or other known color display technology for displaying voter assistance terminal status and issuing prompts and instructions to the voter. It is contemplated that sub-panel 348 be interchangeable within a future sub-panel having a different message display window, or an additional sub-panel utilizing a key configuration.

Other features provided on the voter assist terminal 300 include a lockable module receiving receptacle 352 for receiving ballot data modules (as previously discussed). A hinged door 354 secured by a key lock 356 may be provided to prevent tampering with the data module. An LED pilot light 358 provides a steady green indication to indicate AC power, a steady yellow indication to indicate battery power and a blinking red to indicate a low-battery condition.

The assembly 360 illustrating the ballot path within the voter assist terminal 300 for receiving, marking, sensing and discharging the ballot is shown within the cross-sectional side view of FIG. 21.

That said, the mechanism within the voter assist terminal 300 for receiving, marking, sensing and discharging ballot 306 may comprise of a pair of generally parallel-spaced thin metal plates 362 and 364 which define between their co-facing surfaces a ballot channel 366. The plates diverge toward the front end 368 of the terminal 360 to define a ballot receiving slot 370, the bottom plate extending with the ramp 346 to provide a surface on which the voter places the ballot 306 prior to sliding the ballot into the slot 370. A small slot in the plates enables a first optical detector 372, preferably in the form of a light source and photocell, to determine whether a ballot has been inserted through slot 370. Upon such detection, a ballot-positioning feed roller 374 driven by a drive motor (not shown) advances the ballot along ballot channel 366. To this end, feed roller 374 is paired with opposing feed roller 376. Feed rollers 374 and 376 may be conventional in design and construction, having a rubber ballot engaging surface and being spring-biased into contact with the ballot in a conventional manner through slots in plates 362 and 364. Furthermore, as the ballot needs to travel in both directions within the channel 366, either towards the front of the assembly or towards the back of the assembly, feed rollers 374 and 376 need to be capable of rotating in both directions.

Additionally, preferably four more feed rollers 378, 380, 382 and 384, which may be driven by the same drive motor, are paired with opposing feed rollers 386, 388, 390 and 392, respectively. Feed rollers 378, 380, 382, 384, 386, 388, 390 and the assembly, feed rollers 374 and 376 need to be capable of rotating in both directions.

Additionally, preferably four more feed rollers 378, 380, 382 and 384, which may be driven by the same drive motor, are paired with opposing feed rollers 386, 388, 390 and 392, respectively. Feed rollers 378, 380, 382, 384, 386, 388, 390 and 392 may also be conventional in design and construction, having a rubber ballot engaging surface and being spring-biased into contact with the ballot in a conventional manner through slots in plates 362 and 364; and capable of rotating in both directions.

As previously discussed in greater detail, all ballot routing positioning and marking is controlled by appropriate software in a processor that ensures correct mark positioning from ballot type and position information continuously obtained by optical detectors 372, 394, 396, 398 and 400. With this information, print mechanisms 402 and 404 are capable of accurately making marks in the appropriate places on both sides of the ballots.

With the principal components of the ballot path so described with respect to FIG. 21, the actual path of the ballot during the subject ballot marking procedure will now be illustrated. In particular, FIGS. 22*a*–22*d* are a series of diagramatic cross-sectional views of the assembly 360 with in the housing of the voter assist terminal showing the physical ballot as it traverses its path. These following figures illustrate the ability of the present invention to mark a double-sided ballot using a dual print mechanism.

Figure 22A:
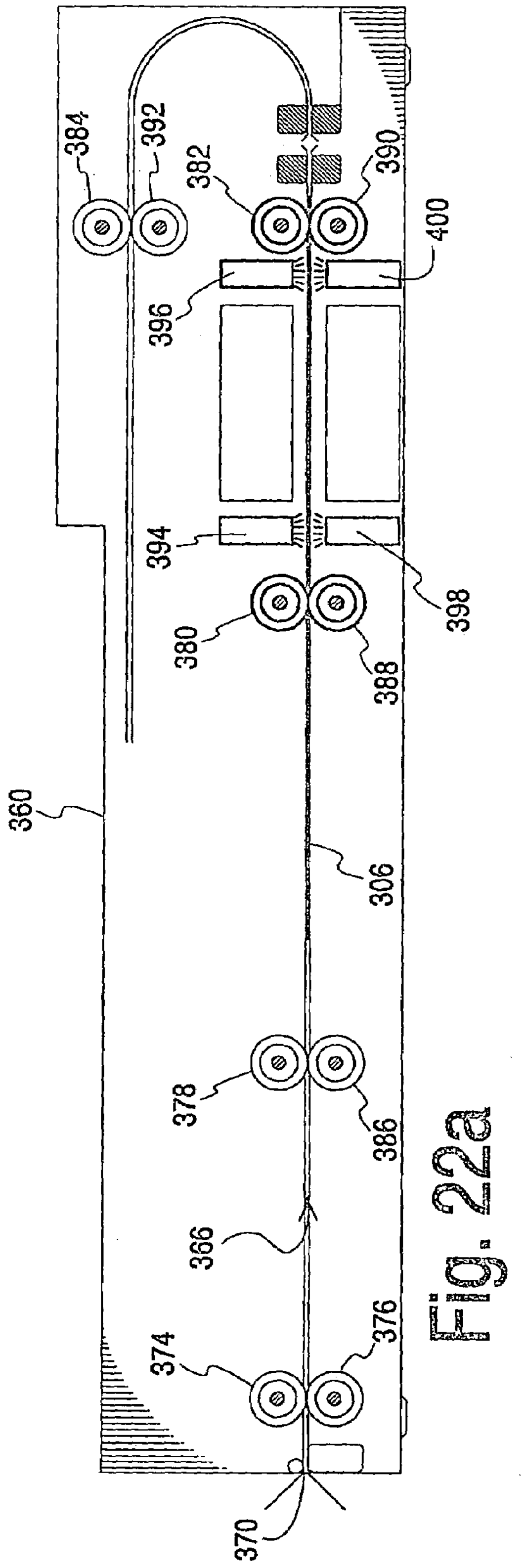
Figure 22B:
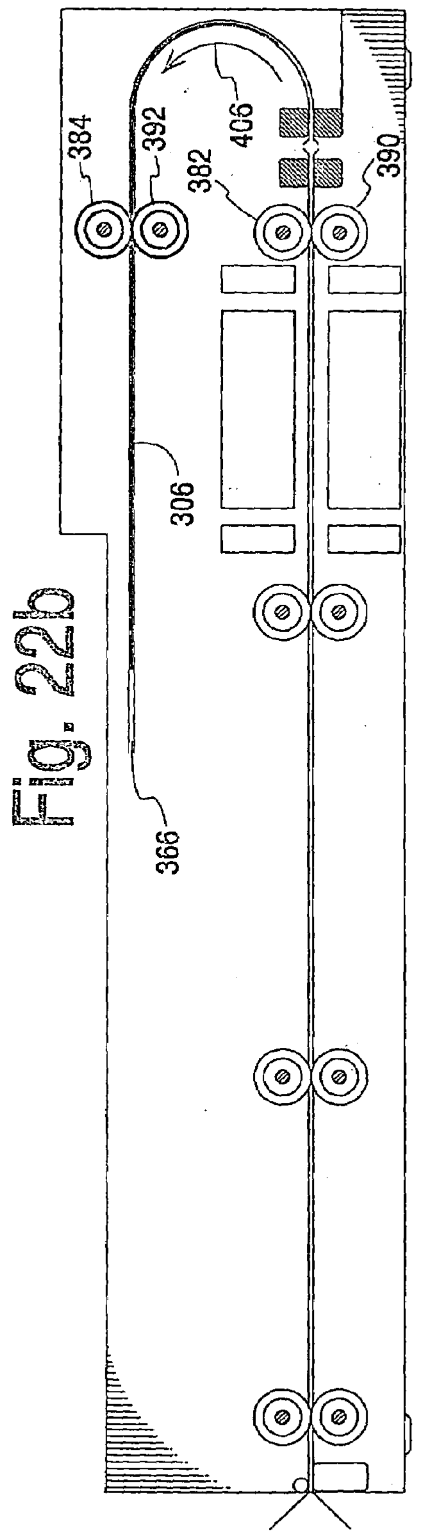

Referring to FIG. 22*a*, when the voter places his or her ballot 306 into slot 370 via ramp 346, the optic reader 372 senses its presence and feed rollers rotate and thereby feed the ballot through channel 366 such that optic readers 394, 396, 398 and 400 can detect the particular size and style of the ballot such that the correct navigational menu may be presented to the voter. Feed rollers 382, 384, 390 and 392 will then continue to feed the ballot into the upper portion 406 of channel 366, as shown in FIG. 22*b*, where it will be held as the voter navigates through their selection process.

Figure 22C:
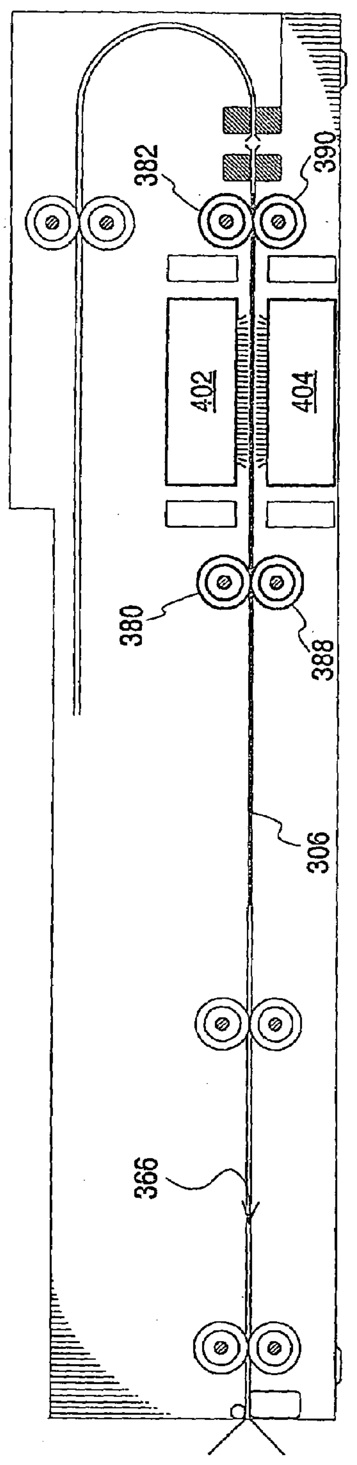
Figure 22D:
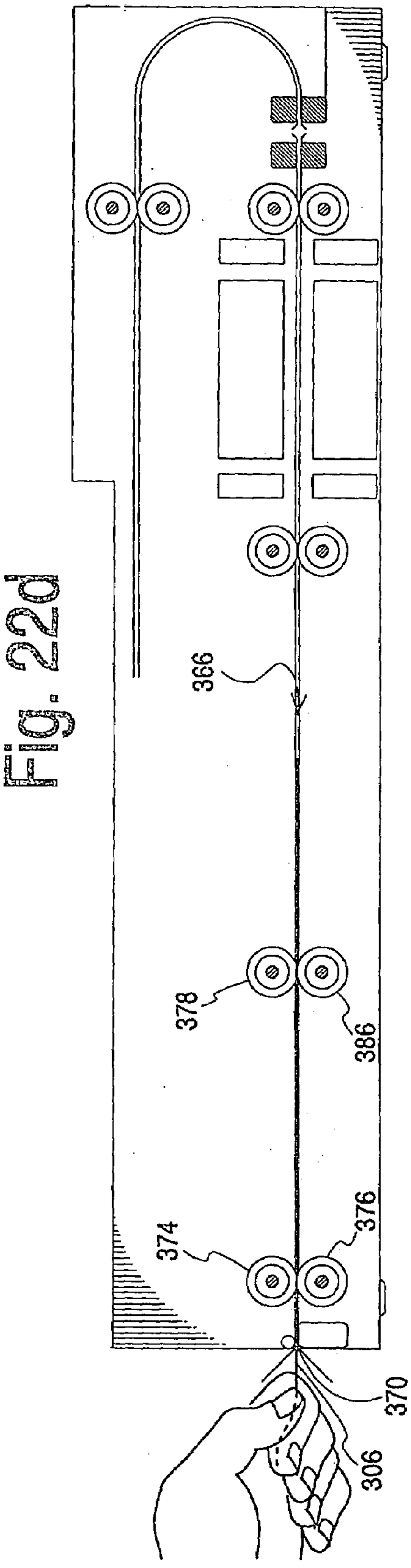

When the voter has finished his or her selection process and has chosen to mark his or her ballot, feed rollers reverse and feed the ballot 306 between print mechanisms 402 and 404 which mark the ballot pursuant to the voters selections, as shown in FIG. 22*c*. Once the ballot has been so marked, the feed rollers continue to feed the ballot 306 back out the slot 370 and return it to the voter, FIG. 22*d*, for appropriate verification and tabulation.

Housing 340 and the assembly 360 may have pivot points to allow for service as well as replacement of component parts, such as ink cartridges and the like. Referring to FIG. 23, the housing 340 is pivotal about pivot 408 and the assembly 360 and pivotal about pivot 410. Such pivot points, 408 and 410, thereby providing the necessary spacing for manual access for access to the paper path and/or service of parts.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A ballot marking apparatus adapted to automatically mark a user-readable pre-printed ballot having a front side and a reverse side and containing a plurality of races on the front and reverse sides, in accordance with selections made by a voter, each of the races having a plurality of candidates and each candidate having an associated space to be marked, said apparatus comprising:

a housing;

a user input device on said housing for voter selection of candidates;

a slot in said housing for receiving the pre-printed ballot from a voter;

means for determining the style of ballot and thereby at least one marking position on each side of said ballot;

a first marking head positioned along a path to print on the front side of said ballot;

a second marking head positioned along said path to print on the reverse of said ballot;

means defining a paper path within said housing for receiving said ballot as said ballot passes through said slot and conveying said ballot past said first and second marking heads, said heads marking said front and reverse sides of said ballot, respectively, in accordance with the space associated with selections made by the voter.

2. The apparatus of claim 1 wherein said user input device is a touchscreen.

3. The apparatus of claim 1 wherein said user input device is a keypad.

4. The apparatus of claim 3 wherein said user input includes an audio function.

5. The apparatus of claim 1 wherein said user input device includes an audio function.

* * * * *